United States Patent
Hu et al.

(10) Patent No.: US 12,164,605 B2
(45) Date of Patent: Dec. 10, 2024

(54) DATA THEFT PREVENTION METHOD AND RELATED PRODUCT

(71) Applicant: HUAWEI TECHNOLOGIES CO., LTD., Shenzhen (CN)

(72) Inventors: Haibo Hu, Hong Kong (CN); Huadi Zheng, Hong Kong (CN); Qingqing Ye, Hong Kong (CN); Chengfang Fang, Singapore (SG); Jie Shi, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 284 days.

(21) Appl. No.: 17/698,619

(22) Filed: Mar. 18, 2022

(65) Prior Publication Data
US 2022/0207117 A1 Jun. 30, 2022

Related U.S. Application Data

(63) Continuation of application No. PCT/CN2020/113631, filed on Sep. 4, 2020.

(30) Foreign Application Priority Data

Sep. 20, 2019 (CN) .......................... 201910897929.1

(51) Int. Cl.
*G06F 21/10* (2013.01)
*G06F 18/24* (2023.01)
(Continued)

(52) U.S. Cl.
CPC .............. *G06F 21/10* (2013.01); *G06F 18/24* (2023.01); *G06F 21/14* (2013.01); *G06F 21/54* (2013.01);
(Continued)

(58) Field of Classification Search
CPC ........ G06F 21/10; G06F 21/54; G06F 21/552; G06F 21/14; G06F 21/60; G06F 21/6245;
(Continued)

(56) References Cited

U.S. PATENT DOCUMENTS 7,010,167 B1 * 3/2006 Ordowski ............... G06F 18/24
                                                       382/165
11,715,461 B2 * 8/2023 Haidar ................... G06N 3/084
                                                       704/232
(Continued)

FOREIGN PATENT DOCUMENTS

CN         105653981 A      6/2016
CN         107491557 A      12/2017
(Continued)

OTHER PUBLICATIONS

Tram r, F., Zhang, F., Juels, A., Reiter, M. K., and Ristenpart, T. Stealing machine learning models via prediction apis.[C] Proceedings of 25th USENIX Security Symposium, 2016.
(Continued)

*Primary Examiner* — Richard G Keehn
(74) *Attorney, Agent, or Firm* — Rimon PC

(57) ABSTRACT

In a data theft prevention method, a data processing apparatus obtains target data, inputs the target data into a recognition model for recognition processing to obtain a first label, where the first label is a label to which the target data belongs. The recognition processing includes: performing, by the recognition model, feature extraction on the target data to obtain a first feature vector; and obtaining, by the recognition model, the first label through prediction based on the first feature vector; and outputs a target label when determining that a second feature vector exists. The second feature vector is a feature vector whose distance from the first feature vector is less than a first threshold. A second label obtained through prediction by using the recognition
(Continued)

model is different from the first label and the target label is a label obtained by performing perturbation processing on the first label.

20 Claims, 7 Drawing Sheets

(51) Int. Cl.
| | |
|---|---|
| G06F 21/14 | (2013.01) |
| G06F 21/54 | (2013.01) |
| G06F 21/55 | (2013.01) |
| G06F 21/60 | (2013.01) |
| G06F 21/62 | (2013.01) |
| G06N 20/00 | (2019.01) |
| G06V 10/40 | (2022.01) |
| H04L 9/40 | (2022.01) |

(52) U.S. Cl.
CPC ............ *G06F 21/552* (2013.01); *G06F 21/60* (2013.01); *G06F 21/6245* (2013.01); *G06N 20/00* (2019.01); *G06V 10/40* (2022.01); *H04L 63/0407* (2013.01); *H04L 63/1466* (2013.01)

(58) Field of Classification Search
CPC ..... G06F 18/24; G06N 20/00; H04L 63/0407; H04L 63/1466; G06V 10/40
See application file for complete search history.

(56) References Cited

U.S. PATENT DOCUMENTS

| | | | | |
|---|---|---|---|---|
| 2015/0242760 | A1* | 8/2015 | Miao | G06N 20/00 706/12 |
| 2017/0017901 | A1* | 1/2017 | Firooz | G06N 20/00 |
| 2018/0260621 | A1 | 9/2018 | Zhou et al. | |
| 2019/0042937 | A1 | 2/2019 | Sheller et al. | |
| 2019/0095629 | A1 | 3/2019 | Lee et al. | |
| 2019/0238568 | A1 | 8/2019 | Goswami et al. | |
| 2019/0286242 | A1* | 9/2019 | Ionescu | G06N 3/084 |
| 2019/0318725 | A1* | 10/2019 | Le Roux | G10L 15/16 |
| 2020/0005196 | A1* | 1/2020 | Cai | G06F 16/9535 |
| 2020/0287900 | A1* | 9/2020 | Wang | H04L 63/0876 |
| 2021/0303903 | A1* | 9/2021 | Watanabe | G06N 3/08 |
| 2022/0207117 | A1* | 6/2022 | Hu | G06F 21/10 |
| 2024/0119268 | A1* | 4/2024 | Hou | G06N 3/048 |
| 2024/0125603 | A1* | 4/2024 | Leng | H04N 23/661 |

FOREIGN PATENT DOCUMENTS

| | | | | |
|---|---|---|---|---|
| CN | 107729762 | A | | 2/2018 |
| CN | 108388560 | A | | 8/2018 |
| CN | 108446649 | A | | 8/2018 |
| CN | 108510071 | A | | 9/2018 |
| CN | 109255364 | A | * | 1/2019 ........... G06K 9/6256 |
| CN | 107368752 | B | | 6/2019 |
| CN | 110097119 | A | | 8/2019 |
| CN | 110163301 | A | | 8/2019 |
| CN | 110795703 | A | | 2/2020 |
| CN | 111435595 | A | * | 7/2020 |
| WO | WO-2016181468 | A1 | * | 11/2016 ............. G06K 9/342 |
| WO | 2019014487 | A1 | | 1/2019 |

OTHER PUBLICATIONS

Kesarwani, M., Mukhoty, B., Arya, V., and Mehta, S. Model extraction warning in mlaas paradigm.[C] Proceedings of the 34th Annual Computer Security Applications Conference, 2018.

N. Papernot, A. Mart n, E. Ulfar, G. Ian and T. Kunal, "Semi-supervised knowledge transfer for deep learning from private training data," arXiv preprint arXiv:1610.05755, 2016.

M. Abadi, A. Chu, I. Goodfellow, H. B. McMahan, I. Mironov, K. Talwar and L. Zhang, Deep learning with differential privacy, ACM SIGSAC Conference on Computer and Communications Security, 2016.

Huadi Zheng et al., "BDPL:A Boundary Differentially Private Layer Against Machine Learning Model Extraction Attacks", total:18 pages.

Manish Kesarwani et al., "Model Extraction Warning in MLaaS Paradigm", Dec. 3, 2018, total:10 pages.

Mika Juuti et al., "PRADA:Protecting against DNN Model Stealing Attacks",Nov. 20, 2018, total:16 pages.

Taesung Lee et al.,"Defending Against neural network model stealing attacks using deceptive perturbations",2019IEEE, total: 8 pages.

* cited by examiner

Algorithm 1 Boundary Differentially Private Layer

Input: Query $x_q \in R^d$
Model $f$
Boundary-Sensitive Zone Parameter $\Delta$
Boundary Privacy Budget $\epsilon$

Output: Perturbed Response $y'_q$

Procedure:
1: if $x_q$ is not cached then
2:    $y_q = f(x_q)$
3:    $CornerPoints = getCornerPoints(\Delta, x_q)$
4:    for $x_{\hat{q}}$ in $CornerPoints$ do
5:      if $x_{\hat{q}}$ is a flipping point then
6:        $y'_q = BRR(y_q, \epsilon)$
7:        $Cache(x_q, y'_q)$
8:        return $y'_q$
9:    return $y_q$
10: else
11:     $y'_q = getCached(x_q)$
12:     return $y'_q$ In step 3, an endpoint feature is calculated, and label flipping detection is performed in step 5, to determine a current query $x_q$ is a sensitive query When the sensitive query appears, in step 6, a boundary random response BRR is called to perturb a query result $y_q$ into $y'_q$, and the query history is stored in step 7

When a sensitive query is queried repeatedly, a protection layer directly returns a historical requery result in steps 11 and 12

FIG. 5

DATA THEFT PREVENTION METHOD AND RELATED PRODUCT

CROSS-REFERENCE TO RELATED APPLICATIONS

This application is a continuation of International Application No. PCT/CN2020/113631, filed on Sep. 4, 2020, which claims priority to Chinese Patent Application No. 201910897929.1, filed on Sep. 20, 2019. The disclosures of the aforementioned applications are hereby incorporated by reference in their entireties.

TECHNICAL FIELD

This application relates to the field of artificial intelligence, and in particular, to a data anti-theft method and a related product.

BACKGROUND

With rapid development of artificial intelligence (AI), machine learning systems are gradually playing an important role in fields such as speech recognition, image processing, medical decision-making, and system security. Currently, many machine learning service providers collect a large amount of labeled data to train an efficient AI model, and encapsulate a prediction service of the AI model into a specific interface for an external call to cloud image recognition, cloud text recognition, or AI speech recognition. Security problems of AI models such as model extraction attacks have attracted the attention of many researchers.

A model extraction attack refers to a scenario in which an attacker infers a network parameter of a machine learning system (namely, the AI model) by analyzing an input (namely, content of a query), an output (namely, an output label or score), and other external information (for example, a network type and a network structure) of the machine learning system. Model extraction attacks lead to security problems, such as intellectual property theft and data leakage. Sample collection and AI model training consume a lot of computing resources and manpower to adjust parameters. A trained AI model is an important intellectual property asset. The model extraction attack causes loss of IP asset to an AI model owner. In addition, the attacker can perform an inference attack based on the stolen AI model, causing personal data leakage in training samples. For example, by inferring whether data of a particular person is present in a training sample for training a disease network, it is possible to determine whether a particular person has the disease. Therefore, an effective AI model anti-theft technology is particularly important for machine learning service providers.

To prevent a parameter of an AI model from being stolen, Kesarwani et al. proposed a theft risk system that is based on monitoring of user query records. A monitoring method implemented by the theft risk system is to send a high theft risk warning by monitoring a coverage rate of user queries in a feature space. In the monitoring method, the theft risk system calculates an overall feature coverage area according to historical queries initiated by a user. When a coverage rate of queries initiated by a single user or a coverage rate of queries initiated by multiple users reaches a preset upper limit, the system sends a high theft risk warning. However, the monitoring method has at least the following disadvantages. (1) The situation of user collusion needs to be assumed. In this case, multi-user query distribution and concurrent processing need to be considered, which is highly complex. (2) Services of suspicious users are interrupted in advance to achieve protection. Therefore, a large number of false positives are likely to be generated, and each returned query result is not protected. Therefore, a new anti-theft method for AI models needs to be studied.

SUMMARY

Embodiments of this application provide a data anti-theft method, and a related product, to effectively prevent a parameter of a recognition model (an AI model) from being stolen.

According to a first aspect, an embodiment of this application provides a data theft prevention method. The method may include: obtaining target data, where the target data includes one or more computer-processable signals; inputting the target data into a recognition model for recognition processing, to obtain a first label, where the first label is a label to which the target data belongs, and the recognition processing includes: performing, by the recognition model, feature extraction processing on the target data to obtain a first feature vector; and obtaining, by the recognition model, the first label through prediction based on the first feature vector; and outputting a target label when determining that a second feature vector exists, where the second feature vector is a feature vector whose distance from the first feature vector is less than a first threshold, a second label obtained by the recognition model through prediction based on the second feature vector is different from the first label, and the target label is a label obtained by performing perturbation processing on the first label.

An execution body of this application may be a data processing apparatus, for example, a server, or a terminal device. At present, in many attacks on an AI model, a precise parameter of the AI model is determined by comparing output labels on a decision boundary of the AI model. Therefore, the data processing apparatus may perturb this part of output labels (namely, the output labels on the decision boundary) to protect the AI model. For most recognition models trained in supervised learning, the decision boundary is critical in a feature space. Features on two sides of the critical location have different labels. In a high dimensional space, the decision boundary of the AI model is presented in a form of a hyperplane or a hypersurface. The following describes, by using a boundary-sensitive zone, which part of output labels needs to be perturbed by the data processing apparatus. The boundary-sensitive zone may be defined as follows:

$$Z_\Delta = \{x \in R^d | \text{dist}(x,f) < \Delta\};$$

where $Z_\Delta$ represents the boundary-sensitive zone, x represents a feature vector, dist(x,f) represents a distance between the feature vector x and the decision boundary, and $\Delta$ represents the first threshold. It can be learned that, if the distance between any feature vector x and the decision boundary is less than the first threshold, the feature vector x falls into the boundary-sensitive zone. The distance between the feature vector x and the decision boundary may be a Euclidean distance, a Manhattan distance, or the like. This is not limited in this embodiment of this application. Because a specific location of the decision boundary usually cannot be predicted in real life, whether a feature vector is located in the boundary-sensitive zone cannot be determined by using the foregoing formula. It may be understood that, for the foregoing first feature vector, if the second feature vector exists, the first feature vector is necessarily located in the boundary-sensitive zone. It can be learned that, by determining whether the second feature vector exists, the data processing apparatus can quickly and accurately determine whether perturbation processing needs to be performed on the first label without knowing the decision boundary.

In this application, the data processing apparatus outputs the target label when determining that the second feature vector exists, so that the parameters of the recognition model can be effectively prevented from being stolen.

In an optional implementation, the determining that a second feature vector exists includes: obtaining a feature vector whose distance from the first feature vector is less than the first threshold to obtain a third feature vector; obtaining a third label through prediction by using the recognition model based on the third feature vector; and determining that the third feature vector is the second feature vector when the first label is different from the third label.

In this implementation, a feature vector whose distance from the first feature vector is less than the first threshold is first obtained as the third feature vector, and then the third label obtained by the recognition model through prediction based on the third feature vector is compared with the first label, to determine whether the third feature vector is the second feature vector, so that whether the second feature vector exists can be accurately and quickly determined.

In an optional implementation, the first feature vector includes N feature values, each feature value corresponds to a dimension, and N is an integer greater than 1; and the obtaining a feature vector whose distance from the first feature vector is less than the first threshold to obtain a third feature vector includes: adding or subtracting a second threshold to or from a feature value of any dimension included in the first feature vector to obtain the third feature vector, where the second threshold is less than the first threshold.

The first feature vector may be a feature vector including N feature values. Because most machine learning tasks use continuous feature values, there are countless feature vectors whose distances from the first feature vector are less than the first threshold. In other words, there are an unlimited quantity of feature vectors in a sphere space with the first feature vector as a center and with a radius less than the first threshold. To efficiently determine whether the second feature vector exists (that is, whether the first feature vector falls into the boundary-sensitive zone), the data processing apparatus only needs to compare a label of an endpoint feature vector of each dimension in the sphere space with the label of the first feature vector; and if the label of at least one endpoint feature vector is different from the label of the first feature vector, it is inferred that the second feature vector exists (that is, the first feature vector is located in the boundary-sensitive zone). A label of a feature vector is a label obtained by the recognition model through prediction based on the feature vector. The endpoint feature vector of a dimension in the sphere space is a feature vector with a largest feature value in the dimension in the sphere space. Therefore, for a feature vector with d dimensions, the data processing apparatus only needs to detect 2d endpoint feature vectors to determine whether the second feature vector exists. A mathematical expression formula is as follows:

$$\exists \Delta_i \in \Delta \cdot I, f(x_q \pm \Delta_i) \neq f(x_q);$$

where $x_q$ represents the first feature vector, $(x_q \pm \Delta_i)$ represents the endpoint feature vector of the first feature vector, $f(x_q)$ represents the label of the first feature vector $x_q$, and $f(x_q \pm \Delta_i)$ represents the label of the endpoint feature vector of the first feature vector.

In this implementation, a second threshold is added to or subtracted from a feature value of any dimension included in the first feature vector, to obtain the third feature vector, so that the endpoint feature vector of the first feature vector can be quickly obtained, to further determine whether the first feature vector is located in the boundary-sensitive zone by using a limited quantity of endpoint feature vectors, to achieve high calculation efficiency.

In an optional implementation, the outputting a target label includes: outputting the first label at a first probability by using a random algorithm, and outputting a fourth label at a second probability, where the fourth label is different from the first label, and a sum of the first probability and the second probability is 1.

Optionally, one of the first label and the fourth label may be a negative label 0, and the other may be a positive label 1. The first probability may be $$\frac{1}{2} + \frac{\sqrt{e^{2\epsilon}-1}}{2+2e^\epsilon},$$

the second probability may be $$\frac{1}{2} - \frac{\sqrt{e^{2\epsilon}-1}}{2+2e^\epsilon},$$

and $\in$ is a privacy protection budget. In this implementation, if the second feature vector exists, for the label $y_q$ obtained based on the first feature vector, the data processing apparatus outputs real $y_q$ at the probability $$\frac{1}{2} + \frac{\sqrt{e^{2\epsilon}-1}}{2+2e^\epsilon}$$

by using the random algorithm, and outputs, at the probability $$\frac{1}{2} - \frac{\sqrt{e^{2\epsilon}-1}}{2+2e^\epsilon},$$

the label obtained by performing perturbation processing on $y_q$. The data processing apparatus may output the target label by using the following formula:

$$A(y_q) = \begin{cases} y_q, & w.p. \cdot \frac{1}{2} + \frac{\sqrt{e^{2\epsilon}-1}}{2+2e^\epsilon} \\ 1-y_q, & w.p. \cdot \frac{1}{2} - \frac{\sqrt{e^{2\epsilon}-1}}{2+2e^\epsilon} \end{cases};$$

where $A(y_q)$ represents the target label, namely, the label obtained by performing perturbation processing on the first label, $y_q$ represents the first label, and $(1-y_q)$ represents a label obtained by flipping the first label. If $y_q$ is 1, $(1-y_q)$ is 0; and if $y_q$ is 0, $(1-y_q)$ is 1. 1 represents a positive label, and 0 represents a negative label.

In this implementation, an incorrect label may be output. That is, there is a possibility that an incorrect label is output, so that an attacker cannot infer a parameter of the recognition model by using the label.

In an optional implementation, the random algorithm provides ε-differential privacy protection, where the parameter ε is referred to as a privacy protection budget.

Differential privacy: A random algorithm M is set, and PM is a set including all possible outputs of M. For any two adjacent data sets D and D', and any subset SM of PM, if the algorithm M satisfies: Pr[M(D)∈SM]<=exp(ε)*Pr[M(D')∈SM], it is said that the algorithm M provides ε-differential privacy protection, where the parameter ε is referred to as the privacy protection budget. Pr[ ] represents a probability at which an event occurs. The algorithm M provides privacy protection by randomizing an output result, and also ensures, by using the parameter ε, that when any record is deleted from a data set, a probability at which the algorithm outputs a result does not significantly change.

To measure a degree of noise, based on a differential privacy-based representation method, a standard of boundary differential privacy (BDP) is proposed in this implementation, and is defined as follows:

$$e^{-\epsilon} \le \frac{Pr[y1 = y2 \mid A(y1), A(y1)]}{Pr[y1 \ne y2 \mid A(y1), A(y1)]} \le e^{\epsilon};$$

where the parameter ε is the privacy protection budget, A(y1) is a label obtained by performing perturbation processing on a label y1, and A(y2) is a label obtained by performing perturbation processing on a label y2. The inequation ensures that the attacker cannot determine with high confidence whether the two results A(y1) and A(y2) after perturbation are consistent with the real results y1 and y2, and therefore, cannot search for the decision boundary directly based on the label flipping method. In addition, the data processing apparatus may correspondingly set the first probability and the second probability based on the privacy protection budget ε. So the flexibility is high.

Boundary differential privacy is a privacy standard used for protecting the decision boundary of the AI model (also referred to as a machine learning model). If a random algorithm with a privacy protection budget ε satisfies the foregoing definition of the BDP, it is said that the algorithm satisfies ε-BDP. The random algorithm used in this implementation satisfies the definition of the formula BDP. In other words, the random algorithm satisfies ε-BDP.

In this implementation, a perturbation processing is performed on the labels by using a random algorithm that satisfies the strict differential privacy definition, so that the attacker cannot search for the decision boundary directly based on the label flipping method, to ensure high security and flexibility.

In an optional implementation, after the inputting the target data into a recognition model for recognition processing, to obtain a first label, the method further includes: outputting the first label when determining that the second feature vector does not exist.

That the second feature vector does not exist indicates that the attacker cannot steal the parameter of the recognition model by using the first label, indicating that the target data is secure data. In this implementation, when the second feature vector does not exist, the data processing apparatus outputs a correct label, to satisfy the requirement of a user (non-attacker).

In an optional implementation, before the inputting the target data into a recognition model for recognition processing to obtain a first label, the method further includes: querying whether there is a historical processing record of the target data in a historical record database, where the historical processing record includes the label to which the target data belongs; and if there is no historical processing record of the target data in the historical record database, performing an operation of inputting the target data into the recognition model for recognition processing, to obtain the first label.

When there is the historical processing record of the target data in the historical record database, a cached historical result is directly returned to the user, to prevent the attacker from determining a perturbation processing manner by querying a same piece of data for a plurality of times, and recognition processing does not need to be performed on the target data. When there is no historical processing record of the target data in the historical record database, recognition processing is performed on the target data by using the recognition model, and a corresponding label is output.

In this implementation, by querying whether there is the historical processing record of the target data in the historical record database, the attacker can be prevented from determining the perturbation processing manner by querying a same piece of data for a plurality of times, and recognition processing does not need to be performed on the target data.

In an optional implementation, the one or more computer-processable signals include: at least one of a speech signal, a text signal, or an image signal.

According to a second aspect, an embodiment of this application provides another data theft prevention method. The method may include: inputting a target image into a recognition model for recognition processing, to obtain a first label, where the first label is a label to which the target image belongs, and the recognition processing includes: performing, by the recognition model, feature extraction processing on the target image to obtain a first feature vector; and obtaining, by the recognition model, the first label through prediction based on the first feature vector; and outputting a target label when determining that a second feature vector exists, where the second feature vector is a feature vector whose distance from the first feature vector is less than a first threshold, a second label obtained by the recognition model through prediction based on the second feature vector is different from the first label, and the target label is a label obtained by performing perturbation processing on the first label.

In this application, the data processing apparatus outputs the target label when determining that the second feature vector exists, so that the parameters of the recognition model can be effectively prevented from being stolen.

In an optional implementation, before the inputting a target image into a recognition model for recognition processing to obtain a first label, the method further includes receiving the target image from a terminal device, and the outputting of a target label includes sending the target label to the terminal device.

In an optional implementation, the determining that a second feature vector exists includes: obtaining a feature vector whose distance from the first feature vector is less than the first threshold to obtain a third feature vector; obtaining a third label through prediction by using the recognition model based on the third feature vector; and determining that the third feature vector is the second feature vector when the first label is different from the third label.

In this implementation, the feature vector whose distance from the first feature vector is less than the first threshold is first obtained, to obtain the third feature vector, and then the third label obtained by the recognition model through prediction based on the third feature vector is compared with the first label, to determine whether the third feature vector is the second feature vector, so that whether the second feature vector exists can be accurately and quickly determined.

In an optional implementation, the first feature vector includes N feature values, each feature value corresponds to a dimension, and N is an integer greater than 1; and the obtaining a feature vector whose distance from the first feature vector is less than the first threshold to obtain a third feature vector includes: adding or subtracting a second threshold to or from a feature value of any dimension included in the first feature vector to obtain the third feature vector, where the second threshold is less than the first threshold.

In this implementation, a second threshold is added to or subtracted from a feature value of any dimension included in the first feature vector, to obtain the third feature vector, so that the endpoint feature vector of the first feature vector can be quickly obtained, to further determine whether the first feature vector is located in the boundary-sensitive zone by using a limited quantity of endpoint feature vectors, thus, achieving high calculation efficiency.

In an optional implementation, the outputting of a target label includes: sending the first label to the terminal device at a first probability by using a random algorithm, and sending a fourth label to the terminal device at a second probability, where the fourth label is different from the first label, and a sum of the first probability and the second probability is 1.

In this implementation, an incorrect label is output at a non-zero probability, so that an attacker cannot infer a parameter of the recognition model by using the label.

In an optional implementation, the random algorithm provides ε-differential privacy protection, where the parameter ε is referred to as a privacy protection budget.

In this implementation, perturbation processing is performed on the labels by using a random algorithm that satisfies the strict differential privacy definition, so that the attacker cannot search for the decision boundary directly based on the label flipping method, to ensure high security and flexibility.

In an optional implementation, after the inputting the target image into a recognition model for recognition processing to obtain a first label, the method further includes outputting the first label when determining that the second feature vector does not exist.

In this implementation, when the second feature vector does not exist, the data processing apparatus outputs a correct label, to satisfy the requirement of a user (non-attacker).

In an optional implementation, before the inputting the target image into a recognition model for recognition processing to obtain a first label, the method further includes: querying whether there is a historical processing record of the target image in a historical record database, where the historical processing record includes the label to which the target data belongs; and if there is no historical processing record of the target image in the historical record database, performing an operation of inputting the target image into the recognition model for recognition processing to obtain the first label.

In this implementation, by querying whether there is a historical processing record of the target image in the historical record database, the attacker can be prevented from determining the perturbation processing manner by querying a same image for a plurality of times. As such recognition processing does not need to be performed on the target image.

According to a third aspect, an embodiment of this application provides a data processing apparatus. The apparatus includes: an obtaining unit, configured to obtain target data, where the target data includes one or more computer-processable signals; an input unit, configured to input the target image into a recognition processing unit; the recognition processing unit, configured to perform recognition processing on the target data by using a recognition model, to obtain a first label, where the first label is a label to which the target data belongs, and the recognition processing includes: performing, by the recognition model, feature extraction processing on the target data to obtain a first feature vector; and obtaining, by the recognition model, the first label through prediction based on the first feature vector; and an output unit, configured to output a target label when a determining unit determines that a second feature vector exists, where the second feature vector is a feature vector whose distance from the first feature vector is less than a first threshold, a second label obtained by the recognition model through prediction based on the second feature vector is different from the first label, and the target label is a label obtained by performing perturbation processing on the first label.

In an optional implementation, the determining unit is configured to obtain a feature vector whose distance from the first feature vector is less than the first threshold to obtain a third feature vector; and the recognition processing unit is further configured to obtain a third label through prediction based on the third feature vector; and the determining unit is configured to determine that the third feature vector is the second feature vector when the first label is different from the third label.

In an optional implementation, the first feature vector includes N feature values, each feature value corresponds to a dimension, and N is an integer greater than 1; and the determining unit is configured to add or subtract a second threshold to or from a feature value of any dimension included in the first feature vector to obtain the third feature vector, where the second threshold is less than the first threshold.

In an optional implementation, the output unit is configured to: output the first label at a first probability by using a random algorithm, and output a fourth label at a second probability, where the fourth label is different from the first label, and a sum of the first probability and the second probability is 1.

In an optional implementation, the random algorithm provides ε-differential privacy protection, where the parameter ε is referred to as a privacy protection budget.

In an optional implementation, the output unit is further configured to output the first label when the determining unit determines that the second feature vector does not exist.

In an optional implementation, the apparatus further includes: a querying unit, configured to query whether there is a historical processing record of the target data in a historical record database, where the historical processing record includes the label to which the target data belongs.

The recognition processing unit is configured to perform recognition processing on the target data to obtain the first label, when the querying unit fails to find the historical processing record of the target data.

In an optional implementation, the one or more computer-processable signals include: at least one of a speech signal, a text signal, or an image signal.

According to a fourth aspect, an embodiment of this application provides another data processing apparatus. The apparatus includes: an input unit, configured to input a target image into a recognition processing unit; the recognition processing unit, configured to perform recognition processing on the target image by using a recognition model, to obtain a first label, where the first label is a label to which the target image belongs, and the recognition processing includes: performing, by the recognition model, feature extraction processing on the target image to obtain a first feature vector; and obtaining, by the recognition model, the first label through prediction based on the first feature vector; and an output unit, configured to output a target label when a determining unit determines that a second feature vector exists, where the second feature vector is a feature vector whose distance from the first feature vector is less than a first threshold, a second label obtained by the recognition model through prediction based on the second feature vector is different from the first label, and the target label is a label obtained by performing perturbation processing on the first label.

In an optional implementation, the apparatus further includes: a receiving unit, configured to receive the target image from a terminal device, and the output unit is configured to send the target label to the terminal device.

In an optional implementation, the determining unit is configured to obtain a feature vector whose distance from the first feature vector is less than the first threshold to obtain a third feature vector; and the recognition processing unit is further configured to obtain a third label through prediction by using the recognition model based on the third feature vector; and the determining unit configured to determine that the third feature vector is the second feature vector when the first label is different from the third label.

In an optional implementation, the output unit is configured to: send the first label to the terminal device at a first probability by using a random algorithm, and send a fourth label to the terminal device at a second probability, where the fourth label is different from the first label, and a sum of the first probability and the second probability is 1.

In an optional implementation, the random algorithm provides $\varepsilon$-differential privacy protection, where the parameter $\varepsilon$ is referred to as a privacy protection budget.

In an optional implementation, the output unit is further configured to output the first label when the determining unit determines that the second feature vector does not exist.

In an optional implementation, the apparatus further includes: a querying unit, configured to query whether there is a historical processing record of the target image in a historical record database, where the historical processing record includes the label to which the target image belongs. The recognition processing unit is configured to perform recognition processing on the target image to obtain the first label, when the querying unit fails to find the historical processing record of the target image.

According to a fifth aspect, an embodiment of this application provides a data processing apparatus. The apparatus includes a memory and a processor. The memory is configured to store code. The processor is configured to perform the following operations by reading the code stored in the memory: obtaining target data, where the target data includes one or more computer-processable signals; inputting the target data into a recognition model for recognition processing, to obtain a first label, where the first label is a label to which the target data belongs, and the recognition processing includes: performing, by the recognition model, feature extraction processing on the target data to obtain a first feature vector; and obtaining, by the recognition model, the first label through prediction based on the first feature vector; and outputting a target label when determining that a second feature vector exists, where the second feature vector is a feature vector whose distance from the first feature vector is less than a first threshold, a second label obtained by the recognition model through prediction based on the second feature vector is different from the first label, and the target label is a label obtained by performing perturbation processing on the first label.

In an optional implementation, the processor is configured to: obtain a feature vector whose distance from the first feature vector is less than the first threshold to obtain a third feature vector; obtain a third label through prediction by using the recognition model based on the third feature vector; and determine that the third feature vector is the second feature vector when the first label is different from the third label.

In an optional implementation, the first feature vector includes N feature values, each feature value corresponds to a dimension, and N is an integer greater than 1; and the processor is configured to add or subtract a second threshold to or from a feature value of any dimension included in the first feature vector to obtain the third feature vector, where the second threshold is less than the first threshold.

In an optional implementation, the processor is configured to: output the first label at a first probability by using a random algorithm, and output a fourth label at a second probability, where the fourth label is different from the first label, and a sum of the first probability and the second probability is 1.

In an optional implementation, the random algorithm provides $\varepsilon$-differential privacy protection, where the parameter $\varepsilon$ is referred to as a privacy protection budget.

In an optional implementation, the processor is further configured to output the first label when determining that the second feature vector does not exist.

In an optional implementation, the processor is further configured to: query whether there is a historical processing record of the target data in a historical record database, where the historical processing record includes the label to which the target data belongs; and if there is no historical processing record of the target data in the historical record database, perform the operation of inputting the target data into the recognition model for recognition processing, to obtain the first label.

In an optional implementation, the one or more computer-processable signals include: at least one of a speech signal, a text signal, or an image signal.

According to a sixth aspect, an embodiment of this application provides another data processing apparatus. The apparatus includes a memory and a processor. The memory is configured to store code. The processor is configured to perform the following operations by reading the code stored in the memory: inputting a target image into a recognition model for recognition processing, to obtain a first label, where the first label is a label to which the target image belongs, and the recognition processing includes: performing, by the recognition model, feature extraction processing on the target image to obtain a first feature vector; and obtaining, by the recognition model, the first label through prediction based on the first feature vector; and outputting a target label when determining that a second feature vector exists, where the second feature vector is a feature vector whose distance from the first feature vector is less than a first threshold, a second label obtained by the recognition model through prediction based on the second feature vector is different from the first label, and the target label is a label obtained by performing perturbation processing on the first label.

In an optional implementation, the apparatus further includes: a receiver, configured to receive the target image from a terminal device; and a transmitter, configured to send the target label to the terminal device under control of the processor.

In an optional implementation, the processor is configured to: obtain a feature vector whose distance from the first feature vector is less than the first threshold to obtain a third feature vector; obtain a third label through prediction by using the recognition model based on the third feature vector; and determine that the third feature vector is the second feature vector when the first label is different from the third label.

In an optional implementation, the first feature vector includes N feature values, each feature value corresponds to a dimension, and N is an integer greater than 1; and the processor is configured to add or subtract a second threshold to or from a feature value of any dimension included in the first feature vector to obtain the third feature vector, where the second threshold is less than the first threshold.

In an optional implementation, the transmitter is configured to: send the first label to the terminal device at a first probability by using a random algorithm under control of the processor, and send a fourth label to the terminal device at a second probability, where the fourth label is different from the first label, and a sum of the first probability and the second probability is 1.

In an optional implementation, the random algorithm provides ε-differential privacy protection, where the parameter ε is referred to as a privacy protection budget.

In an optional implementation, the processor is further configured to output the first label when determining that the second feature vector does not exist.

In an optional implementation, the processor is further configured to: query whether there is a historical processing record of the target image in a historical record database, where the historical processing record includes the label to which the target image belongs; and if there is no historical processing record of the target image in the historical record database, perform an operation of inputting the target image into the recognition model for recognition processing, to obtain the first label.

According to a seventh aspect, an embodiment of this application provides a computer-readable storage medium, a non-transitory or transitory. The computer storage medium stores a computer program. The computer program includes program instructions. When the program instructions are executed by a processor, the processor is enabled to perform the method in the first aspect or the second aspect, and any optional implementations.

According to an eighth aspect, an embodiment of this application provides a chip. The chip includes a processor and a data interface. The processor reads, through the data interface, instructions stored in a memory, to perform the method in the first aspect to the second aspect, and any optional implementation.

According to a ninth aspect, an embodiment of this application provides a computer program product. The computer program product includes program instructions. When the program instructions are executed by a processor, the processor is enabled to perform the method in the first aspect or the second aspect, and any optional implementation.

BRIEF DESCRIPTION OF DRAWINGS

To describe the technical solutions in the embodiments of this application or in the background more clearly, the following briefly describes the accompanying drawings required for describing the embodiments of this application or the background.

FIG. 5 is a schematic diagram of code executed by a protection layer according to an embodiment of this application;

DESCRIPTION OF EMBODIMENTS

In the embodiments of the specification, claims, and accompanying drawings of this application, the terms "first", "second", "third" and so on are intended to distinguish between similar objects but do not necessarily indicate a specific order or sequence. Furthermore, the terms "comprise" and "have" and any variations thereof are intended to cover non-exclusive inclusions, e.g., include a series of steps or units. The methods, systems, products, or devices are not necessarily limited to those steps or units clearly listed, but may include other steps or units not clearly listed or inherent to the processes, methods, products, or devices. "And/or" is used for indicating that one or both of the two objects to which it is connected are selected. For example, "A and/or B" represents A, B, or A+B.

With the rapid development of artificial intelligence, machine learning systems are gradually playing an important role in the fields such as speech recognition, image processing, medical decision-making, and system security. Currently, many machine learning service providers collect a large amount of labeled data to train an efficient AI model, and encapsulate a prediction service of the AI model into a specific interface for an external call to functionalities such as cloud image recognition, cloud text recognition, or AI speech recognition. However, while the AI model provides an efficient prediction service (such as image recognition), there are also security problems such as a model extraction attack. Model extraction attack refers to that an attacker infers a network parameter of a machine learning system (namely, the AI model), namely, a parameter of the AI model by analyzing an input (namely, content of a query), an output (namely, an output label or score), and other external information (for example, a network type and a network structure) of the machine learning system.

Figure 1:
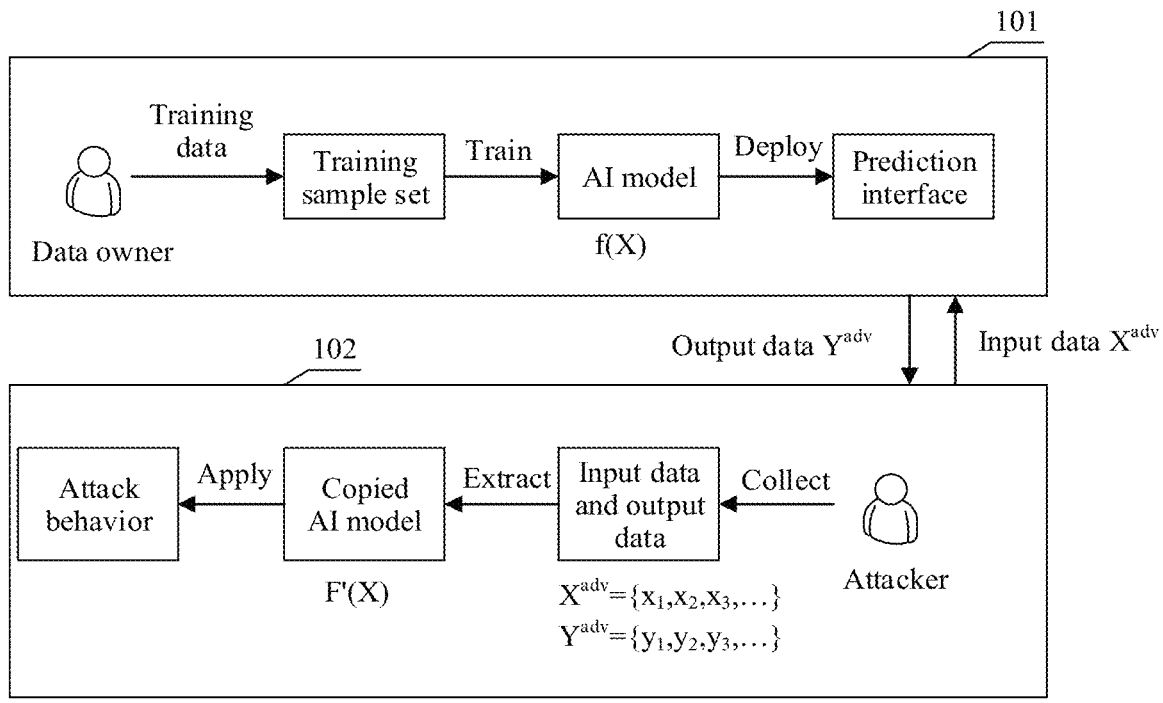
FIG. 1 is a schematic diagram of training an AI model and a model extraction attack according to an embodiment of this application.

FIG. 1 is a schematic diagram of training an AI model and a model extraction attack according to an embodiment of this application. In FIG. 1, a diagram 101 illustrates a process in which a server side obtains an AI model through training by using a training sample set and encapsulates a prediction service of the AI model into a specific interface for an external call. As shown in FIG. 1, the process in which the server side obtains the AI model through training by using the training sample set and encapsulates the prediction service of the AI model into the specific interface for the external call is as follows: A data owner uploads training data to the server side, so that the server side obtains the training sample set including a plurality of training samples; and the server side trains an initialized AI model by using the training sample set to obtain a trained target AI model; and encapsulates the prediction service of the target AI model into the special interface for the external call. A device at the server side may be a server, a terminal device, or the like. The training sample may be image data, text data, speech data, or the like. The prediction service of the target AI model may be image recognition, speech recognition, text recognition, text translation, or the like. It should be understood that, the server side trains the initialized AI model by using different training samples, to obtain the target AI model that provides different prediction services. In FIG. 1, the diagram 102 shows a process in which an attack end implements a model extraction attack. As shown in FIG. 1, a process in which the attack end implements the model extraction attack is as follows: (1) The attack end constructs a random sample (namely, input data $X^{adv}$) and queries by using a prediction interface, and modifies a single feature value in the random sample based on a query result (namely, output data $Y^{adv}$) of the prediction interface, and queries again. (2) The attack end analyzes a decision boundary of the AI model by comparing query results, and continues to modify in a random sample near the decision boundary, and queries again. (3) After accumulating a large quantity of queries (namely, input data) including boundary information and corresponding query results, the attack end accurately extracts the parameter of the AI model by using a method of solving a mathematical equation or re-training. (1) and (2) are processes of collecting the input data and the output data in FIG. 1. Queries including boundary information and corresponding query results may be obtained by collecting the input data and the output data. (3) is a process of extracting the parameter of the AI model in FIG. 1. Herein, the query refers to the input data, the query result refers to the output data, and a query operation refers to inputting the input data to the server side. After stealing the parameter or parameters of the AI model, the attack end may implement attack behaviors such as the model extraction attack, a model evasion attack, and a model inference attack. These attacks are likely to cause some serious consequences, such as property damage and privacy data leakage to an AI model owner. Therefore, a data theft prevention method, namely, a method for preventing parameters of an AI model from being stolen needs to be studied.

The data theft prevention method provided in the embodiments of this application may be applied to any recognition model (an AI model) including a classifier or a classification model. The data theft prevention method provided in the embodiments of this application can be applied to scenarios such as image recognition, speech recognition, text recognition, and text translation. The following separately briefly describes applications of the data theft prevention method provided in the embodiments of this application in an image recognition scenario and a speech recognition scenario.

Image recognition scenario: The server recognizes labels of objects included in a to-be-recognized image. For example, the server recognizes an animal included in each image by using an animal image recognition network.

Speech recognition scenario: A terminal device (for example, a mobile phone) recognizes speech data entered by a user. For example, a user enters speech data by using a mobile phone, and the mobile phone converts the speech data into text and sends the text to a corresponding device.

In the foregoing application scenarios, when providing prediction services such as image recognition and speech recognition by using the recognition model, the server and the terminal device may implement the data theft prevention method provided in the embodiments of this application, to prevent the parameters of the recognition model from being stolen. The following first describes a schematic diagram of a system architecture according to an embodiment of this application. The data theft prevention method provided in the embodiments of this application may be applied to the system architecture.

Figure 2:
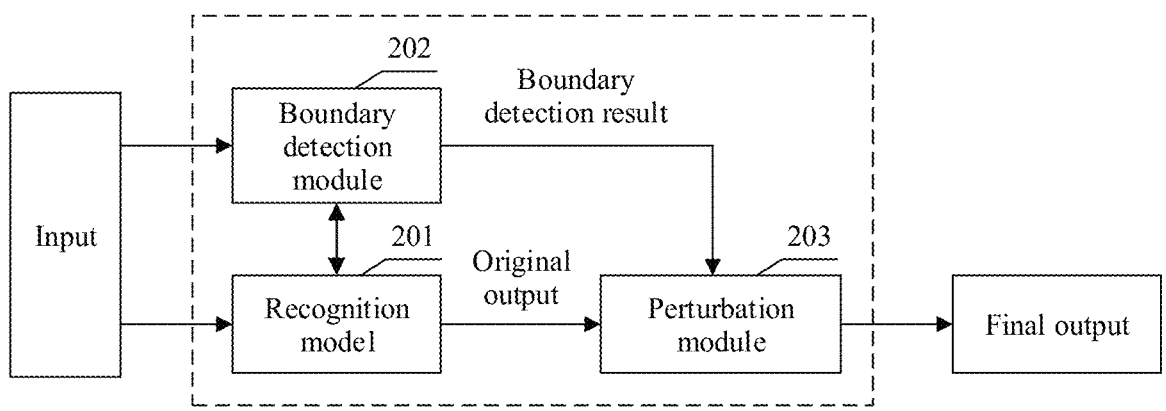
FIG. 2 is a schematic diagram of a system architecture according to an embodiment of this application.

FIG. 2 is a schematic diagram of a system architecture according to an embodiment of this application. As shown in FIG. 2, the system architecture may include: a recognition model 201, a boundary detection module 202, and a perturbation module 203. In the system architecture in FIG. 2, the boundary detection module 202 and the perturbation module 203 are added based on the recognition model 201 (corresponding to an existing machine learning model interface). The recognition model 201 is configured to perform recognition processing on input data, to obtain an original output. For example, the recognition model 201 is an image recognition model, and the recognition model 201 is configured to perform image recognition on an input image (corresponding to the input data), to obtain an image recognition result (corresponding to the original output). The boundary detection module 202 is configured to detect whether the input data is sensitive data or a sensitive query. Optionally, the boundary detection module 202 determines, by using a feature obtained by performing feature extraction processing on the input data, whether the input data is sensitive data or sensitive query. A specific operation performed by the boundary detection module 202 is described in detail later. The perturbation module 203 is configured to: when a boundary detection result indicates that the input data is sensitive data, perform perturbation processing on the original output, and output a final output (namely, an output obtained by performing perturbation processing on the original output), and when the boundary detection result indicates that the input data is not sensitive data, directly output the original output. For example, the recognition module performs recognition processing on an image, to obtain an original label. The perturbation module 203 is configured to: when the boundary detection result indicates that the input data is the sensitive data, perform perturbation processing on the original label, and output a label obtained after the perturbation processing. An implementation in which the perturbation module 203 performs perturbation processing on the original output is described in detail later. A recognition model architecture in FIG. 2 may be applied to a server, to protect a parameter of a recognition model in the server from being stolen, or may be applied to a terminal device, to protect a parameter of a recognition model in the terminal device from being stolen. Neither the boundary detection module 202 nor the perturbation module 203 is related to a specific type of the recognition model 201 and a specific prediction service provided by the recognition model 201. In other words, both the boundary detection module 202 and the perturbation module 203 are plug-in modules, and may be directly applied to any machine learning system, and do not need to be re-designed based on the type of the recognition model or the prediction service provided by the recognition model. The following describes a data theft prevention method provided in an embodiment of this application with reference to the accompanying drawings.

Figure 3:
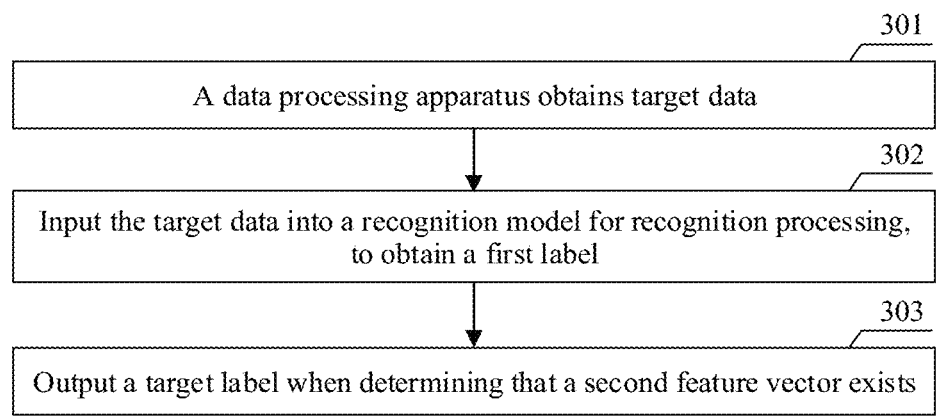
FIG. 3 is a flowchart of a data theft prevention method according to an embodiment of this application.

FIG. 3 is a flowchart of a data theft prevention method according to an embodiment of this application. As shown in FIG. 3, the method may include the following steps.

301. A data processing apparatus obtains target data.

The target data includes one or more computer-processable signals. The data processing apparatus may be a server; or may be a terminal device, for example, a mobile phone, a tablet computer, a notebook computer, an augmented reality (AR) device, a virtual reality (VR) device, or an in-vehicle terminal; or may be another computer device that provides a prediction service by using an AI network. In some embodiments, the data processing apparatus is a server, and that the data processing apparatus obtains target data may be that the data processing apparatus receives the target data from a terminal device, or may obtain the target data from another device (for example, a server). The target data may be image data, text data, speech data, or the like. In some embodiments, the data processing apparatus is a terminal device, for example, a mobile phone, and that the data processing apparatus obtains target data may be that the data processing apparatus receives, by using an input/output interface, the target data entered by a user, for example, speech data or image data entered by the user. In some embodiments, the data processing apparatus is a computer device, and that the data processing apparatus obtains target data may be that the data processing apparatus receives the target data imported by using a removable disk or a data line, or receives the target data received by using an input device (for example, a keyboard or an audio device).

302. Input the target data into a recognition model for recognition processing, to obtain a first label.

The first label is a label to which the target data belongs, and the recognition processing includes: performing, by the recognition model, feature extraction processing on the target data to obtain a first feature vector; and obtaining, by the recognition model, the first label through prediction based on the first feature vector. The recognition model predicts, based on the first feature vector, that the first label may be a classifier (for example, a fully connected layer) in the recognition model, to classify the first feature vector, to obtain the first label. In scenarios such as image recognition and object detection, input data (namely, the target data) of the data processing apparatus may be (image width*height) three-dimensional arrays, where an array represents RGB color values of the image. That is, one dimension corresponds to an R value, one dimension corresponds to a G value, and one dimension corresponds to a B value. The data processing apparatus may re-adjust a scale of the image (rescale image), so that an array input by the data processing apparatus becomes an array of m*n*3, where m and n are fixed input data sizes of the recognition model. An output of the data processing apparatus may be a label of the image or a coordinate and classification of a to-be-detected object. In scenarios of semantic analysis and machine translation, input data (namely, the target data) of the data processing apparatus may be a segment of text, and data input into the recognition model may be a multidimensional array corresponding to each word (a word-based language such as English) (the array corresponding to each word is calculated by using an existing algorithm such as word to vector), and an output may be a semantic label (for example, a mood or positive or negative emotion of the sentence), or a corresponding translation. In other words, the data processing apparatus may first preprocess the input target data (for example, adjust the scale of the image), and then input the preprocessed data to the recognition model for recognition processing, and output the label.

Optionally, the data processing apparatus may input the target data into the recognition model 201 for recognition processing, to obtain the first label. A typical binary classification model may be represented as:

$$y = f(x) = \begin{cases} 0 \text{ negative label} \\ 1 \text{ positive label} \end{cases}. \qquad (1)$$

When the data processing apparatus obtains input data x, the data processing apparatus performs recognition processing on the input data x based on a pre-trained recognition model, and provides whether an output result y is 1 (positive label) or 0 (negative label). Different types of classifiers may be configured in the recognition model. A type of the first label is not limited in this embodiment of this application. For example, the target data is a to-be-recognized image, the recognition model is used for image recognition, and the first label is a label of an object included in the to-be-recognized image. In another example, the target data is a text image, the recognition model is used for text recognition, and the first label is a label of a piece of text in the text image. It may be understood that, the first label may be a positive label, a negative label, or a label of another type.

303. Output a target label when determining that a second feature vector exists.

Figure 4:
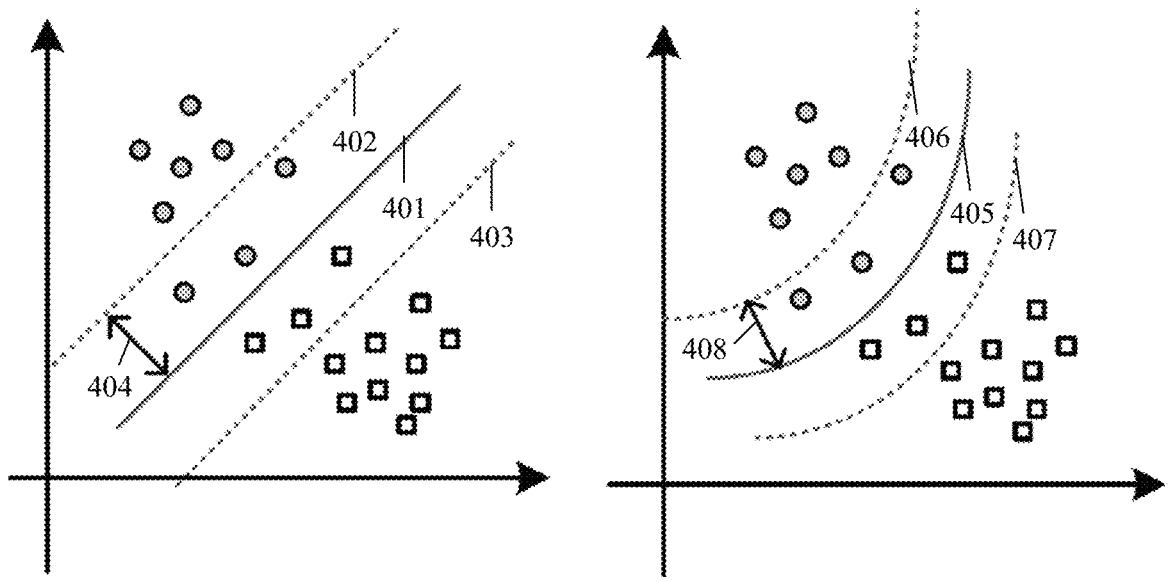
FIG. 4 is a schematic diagram of a decision boundary of a recognition model in a two-dimensional space.

The second feature vector is a feature vector whose distance from the first feature vector is less than a first threshold, a second label obtained by the recognition model through prediction based on the second feature vector is different from the first label, and the target label is a label obtained by performing perturbation processing on the first label. An objective of this embodiment of this application is to protect an output result close to a decision boundary. The following uses a boundary-sensitive zone to describe a principle that the data processing apparatus outputs the target label when determining that the second feature vector exists, to prevent a parameter of the recognition model from being stolen. The boundary-sensitive zone may be defined as follows:

$$Z_\Delta = \{x \in R^d | \text{dist}(x,f) < \Delta\} \qquad (2);$$

where $Z_\Delta$ represents the boundary-sensitive zone, x represents a feature vector, dist(x,f) represents a distance between the feature vector x and the decision boundary, and $\Delta$ represents the first threshold. It can be learned that, if the distance between any feature vector x and the decision boundary is less than the first threshold, the feature vector x falls into the boundary-sensitive zone. The distance between the feature vector x and the decision boundary may be a Euclidean distance, a Manhattan distance, or the like. This is not limited in this embodiment of this application. FIG. 4 is a schematic diagram of the decision boundary of the recognition model in a two-dimensional space. In a high dimensional space, the decision boundary of the recognition model is presented in a form of a hyperplane or a hypersurface. As shown in FIG. 4, 401 represents the decision boundary, the decision boundary 401 is a hyperplane, a hyperplane 402 and a hyperplane 403 are hyperplanes located at a distance from the decision boundary 401 by a first threshold, and a distance indicated by 404 is the first threshold. The region between the hyperplane 402 and the hyperplane 403 is the boundary-sensitive zone, and the boundary-sensitive zone does not include the hyperplane 402 and the hyperplane 403. As shown in FIG. 4, a hypersurface 405 represents the decision boundary, a hypersurface 406 and a hypersurface 407 are hypersurfaces located at a distance from the decision boundary 401 by the first threshold, and the distance indicated by 408 is the first threshold. The region between the hypersurface 406 and the hypersurface 407 is the boundary-sensitive zone. The boundary-sensitive zone does not include the hypersurface 406 and the hypersurface 407.

In a practical application, a specific location of the decision boundary usually cannot be predicted. Therefore, whether a feature vector is located in the boundary-sensitive zone cannot be determined by using the foregoing formula (2). It may be understood that, if one feature vector is located in the boundary-sensitive zone, there is necessarily at least one second feature vector whose distance from the feature vector is less than the first threshold, and a label obtained by the recognition model through prediction based on the second feature vector is different from the label obtained by the recognition model through prediction based on the feature vector. Therefore, for the foregoing first feature vector, if the second feature vector exists, the first feature vector is necessarily located in the boundary-sensitive zone. When determining that the second feature vector exists, the data processing apparatus outputs the target label obtained by performing perturbation processing on the first label, so that the parameter of the recognition model can be prevented from being stolen. In this way, whether any feature vector is located in the boundary-sensitive zone can be accurately determined. Optionally, when determining the boundary-sensitive zone, the data processing apparatus may determine, by using the formula (2), whether the first feature vector is located in the boundary-sensitive zone.

Optionally, step 303 may be replaced with: Output the first label when determining that a second feature vector does not exist. It may be understood that, the data processing apparatus does not perform perturbation processing on a label obtained based on a feature vector not located in the boundary-sensitive zone, but directly outputs the label, so that an accurate label can be quickly output. In other words, the data processing apparatus performs perturbation processing only on a label obtained based on a feature vector located in the boundary-sensitive zone, and the label obtained based on the feature vector not located in the boundary-sensitive zone remains unchanged, and most of labels output by the data processing apparatus are correct, so that the impact on labels output by the recognition model is relatively small, to ensure quality of services.

In this embodiment of this application, the perturbation processing is performed on the label obtained based on the feature vector located in the boundary-sensitive zone, to effectively prevent the parameter of the recognition model from being stolen. The impact on the labels output by the recognition model is relatively small, and quality of services is high.

In a practical application, the data processing apparatus usually fails to predict the specific location of the decision boundary, and therefore, the data processing apparatus cannot determine whether each feature vector is located in the boundary-sensitive zone by using the formula (2). For the foregoing first feature vector, the data processing apparatus may determine whether the first feature vector is located in a boundary-sensitive zone by determining whether the second feature vector exists. The following describes an implementation of determining whether the second feature vector exists.

When the data processing apparatus cannot predict the specific location of the decision boundary, whether the first feature vector is located in the boundary-sensitive zone may be determined in the following manner: A boundary detection module 202 obtains a third feature vector whose distance from the first feature vector is less than the first threshold, and sends the third feature vector to the recognition model 201; the recognition model 201 obtains a third label through prediction based on the third feature vector, and sends the first label and the third label to a boundary detection module 202; and the boundary detection module 202 determines that the second feature vector exists, namely, determines that the first feature vector is located in the boundary-sensitive zone, when the first label is different from the third label. It should be understood that, the boundary detection module 202 and the recognition model 201 jointly determine whether the second feature vector exists.

Feature vectors whose distances from the first feature vector are less than the first threshold are all located in a sphere space established with the first feature vector $x_q$ as a center. Therefore, a manner of determining whether the second feature vector exists may be determining whether at least one feature vector whose label obtained by the recognition model through prediction processing is different from the first label exists in the sphere space. A mathematical expression for this manner is as follows:

$$\exists x' \in B(x_q, \Delta), s.t. f(x') \neq f(x_q) \qquad (3);$$

where a feature vector x' represents a feature vector whose distance from the first feature vector $x_q$ is less than the first threshold $\Delta$, $B(x_q, \Delta)$ represents a set of feature vectors whose distances from the feature vector x' are less than the first threshold, f(x') represents a label of the feature vector x', and $f(x_q)$ represents the label of the feature vector $x_q$. Any feature vector that satisfies the formula (3) may be the second feature vector. A manner in which the third label is obtained through prediction by using the recognition model based on the third feature vector may be the same as a manner in which the recognition model obtains the first label through prediction based on the first feature vector. It should be understood that, the data processing apparatus may determine, in a plurality of manners, whether there is the second feature vector whose distance from the first feature vector is less than the first threshold and whose label is different from the label of the first feature vector. This is not limited in this embodiment of this application.

In this implementation, the feature vector whose distance from the first feature vector is less than the first threshold is first obtained as the third feature vector, and then the third label obtained by the recognition model through prediction based on the third feature vector is compared with the first label, to determine whether the third feature vector can be used as the second feature vector, so that whether the second feature vector exists can be accurately and quickly determined.

Because most machine learning tasks use continuous feature values, there are countless feature vectors whose distances from the first feature vector are less than the first threshold. In other words, there are an unlimited quantity of feature vectors in a sphere space with the first feature vector as a center and with a radius less than the first threshold. Because there are countless feature vectors whose distances from the first feature vector are less than the first threshold, it is difficult to quickly determine whether the second feature vector exists. In practical application, the data processing apparatus may determine whether the second feature vector exists by using a limited quantity of feature vectors, to quickly determine whether the second feature vector exists. For example, the data processing apparatus may randomly generate F feature vectors whose distances from the first feature vector are less than the first threshold. If there is no second feature vector in the F feature vectors, it is determined that the second feature vector does not exist. F may be 6, 8, 10, 100, 1000, or the like. It should be understood that, the data processing apparatus may also determine whether the second feature vector exists by using a limited quantity of feature vectors in another manner. This is not limited in this embodiment of this application. An embodiment of this application provides a manner of determining whether the second feature vector exists by using a limited quantity of endpoint feature vectors.

Optionally, the data processing apparatus may determine whether the second feature vector exists in the following manner: The boundary detection module 202 obtains 2d endpoint feature vectors of the first feature vector, and sends the 2d endpoint feature vectors to the recognition model 201. The recognition model 201 separately performs prediction processing on the endpoint feature vectors, to obtain 2d labels, and sends the 2d labels to the boundary detection module 202. The boundary detection module 202 determines that the second feature vector does not exist, namely, the first feature vector is not located in the boundary-sensitive zone, when the 2d labels are all the same as the first label, and the boundary detection module 202 determines that the second feature vector exists, namely, the first feature vector is located in the boundary-sensitive zone, when the 2d labels are not all the same as the first label. A boundary detection result output by the boundary detection module 202 is used for indicating that the target data is sensitive data or is not sensitive data, namely, for indicating that the second feature vector exists or does not exist. The first feature vector has d dimensions. The 2d labels are in one-to-one correspondence with the 2d endpoint feature vectors, and d is an integer greater than 1. That the first feature vector has d dimensions indicates that the first feature vector includes d feature values, and each feature value corresponds to one dimension. Optionally, the data processing apparatus sequentially performs prediction processing on the endpoint feature vectors of the first feature vector by using the recognition model, and compares the label obtained each time with the first label. If a label obtained by the recognition model by performing prediction processing on an endpoint feature vector is different from the first label, the recognition model stops performing prediction processing on other endpoint feature vectors, and it is determined that the second feature vector exists. If the labels obtained by the recognition model by performing prediction processing on the endpoint feature vectors are all the same as the first label, it is determined that the second feature vector does not exist.

The foregoing second feature vector may be an endpoint feature vector of the first feature vector. The obtaining a third feature vector whose distance from the first feature vector is less than the first threshold may be that the boundary detection module 202 adds or subtracts a second threshold to or from a feature value of any dimension included in the first feature vector to obtain the third feature vector, where the second threshold is less than the first threshold. It may be understood that, the first feature vector corresponds to two endpoint feature vectors in each dimension, and when the second threshold is added to or subtracted from a feature value of the first feature vector in a dimension, an endpoint feature vector corresponding to the first feature vector in the dimension may be obtained. Therefore, the first feature vector that has d dimensions has 2d endpoint feature vectors. For example, the first feature vector is a three-dimensional vector (A, B, C), A, B, and C are respectively feature values of the first feature vector in three dimensions, and six endpoint feature vectors of the first feature vector are respectively (A−$\Delta_i$, B, C), (A+$\Delta_i$, B, C), (A, B−$\Delta_i$, C), (A, B−$\Delta_i$, C), (A, B, C−$\Delta_i$), and (A, B, C+$\Delta_i$).

Optionally, a mathematical expression formula for determining whether the second feature vector exists is as follows:

$$\exists \Delta_i \in \Delta \cdot I, f(x_q \pm \Delta_i) \neq f(x_q) \quad (4);$$

where $x_q$ represents the first feature vector, $(x_q \pm \Delta_i)$ represents the endpoint feature vector of the first feature vector, $f(x_q)$ represents the label of the first feature vector $x_q$, $f(x_q \pm \Delta_i)$ represents the label of the endpoint feature vector of the first feature vector, and d is an integer greater than 1. If an endpoint feature vector of the first feature vector satisfies the formula (4), the second feature vector exists.

In this implementation, a second threshold is added to or subtracted from a feature value of any dimension included in the first feature vector, to obtain the endpoint feature vector of the first feature vector, to further determine whether the second feature vector exists by using a limited quantity of endpoint feature vectors, to achieve high calculation efficiency.

The foregoing embodiment does not describe an implementation of how to output the target label. The following describes an implementation of outputting the target label according to another embodiment of this application.

That the data processing apparatus outputs the target label may be that the perturbation module 203 outputs the first label at a first probability by using a random algorithm, and outputs a fourth label at a second probability. The fourth label is different from the first label, and a sum of the first probability and the second probability is 1. Optionally, after receiving a boundary detection result indicating that the second feature vector exists, the perturbation module 203 outputs the first label at the first probability by using the random algorithm, and outputs the fourth label at the second probability. In some embodiments, the data processing apparatus is a server. The data processing apparatus may send the first label to a terminal device at the first probability, and sends the fourth label to the terminal device at the second probability. In some embodiments, the data processing apparatus is a terminal device, for example, a mobile phone. The data processing apparatus may display the first label at the first probability, and display the fourth label at the second probability.

Optionally, one of the first label and the fourth label may be a negative label 0, and the other may be a positive label 1. Optionally, the fourth label is a label of an endpoint feature vector of the first feature vector, and is different from the first label. For example, the data processing apparatus performs prediction processing on an endpoint feature vector of the first feature vector by using the recognition model, to obtain the fourth label, and outputs the first label at the first probability, and outputs the fourth label at the second probability. The first probability may be $$\frac{1}{2} + \frac{\sqrt{e^{2\epsilon-1}}}{2+2e^{\epsilon}},$$

the second probability may be $$\frac{1}{2} - \frac{\sqrt{e^{2\epsilon-1}}}{2+2e^{\epsilon}},$$

and $\in$ is a privacy protection budget. In this implementation, an incorrect label is output at the second probability, so that an attacker cannot infer a parameter of the recognition model by using the label. In some embodiments, if the second feature vector exists, the data processing apparatus outputs a real label $y_q$ at the probability of $$\frac{1}{2} + \frac{\sqrt{e^{2\epsilon-1}}}{2+2e^{\epsilon}}$$

by using the random algorithm, and outputs, at the probability of $$\frac{1}{2} - \frac{\sqrt{e^{2\epsilon-1}}}{2+2e^{\epsilon}},$$

a label obtained by performing perturbation processing on the label $y_q$. The perturbation module 203 in the data processing apparatus may output the target label by using the following formula:

$$A(y_q) = \begin{cases} y_q, & w \cdot p \cdot \frac{1}{2} + \frac{\sqrt{e^{2\epsilon-1}}}{2+2e^{\epsilon}} \\ 1-y_q, & w \cdot p \cdot \frac{1}{2} - \frac{\sqrt{e^{2\epsilon-1}}}{2+2e^{\epsilon}} \end{cases} ; \quad (5)$$

where $A(y_q)$ represents the target label, namely, the label obtained by performing perturbation processing on the first label, $y_q$ represents the first label, and $(1-y_q)$ represents a label obtained by flipping the first label. If $y_q$ is 1, $(1-y_q)$ is 0; and if $y_q$ is 0, $(1-y_q)$ is 1. 1 represents a positive label, and 0 represents a negative label.

The perturbation module 203 in the data processing apparatus may also output the target label by using the following formula:

$$A(y_q) = \begin{cases} y_q, & w \cdot p \cdot \frac{1}{2} + \frac{\sqrt{e^{2\epsilon-1}}}{2+2e^{\epsilon}} \\ y'_q, & w \cdot p \cdot \frac{1}{2} - \frac{\sqrt{e^{2\epsilon-1}}}{2+2e^{\epsilon}} \end{cases} ; \quad (6)$$

where $A(y_q)$ represents the target label, namely, the label obtained by performing perturbation processing on the first label; $y_q$ represents the first label, and $y'_q$ represents any label different from $y_q$. For example, $y'_q$ is a label of an endpoint feature vector of the first feature vector, and is different from the first label.

Optionally, the random algorithm provides ε-differential privacy protection, where the parameter ε is referred to as a privacy protection budget.

To measure a degree of noise, based on a differential privacy-based representation method, a standard of boundary differential privacy is proposed in this implementation, and is defined as follows:

$$e^{-\epsilon} \leq \frac{Pr[y1 = y2 \mid A(y1), A(y1)]}{Pr[y1 \neq y2 \mid A(y1), A(y1)]} \leq e^{\epsilon}; \quad (7)$$

where the parameter ε is the privacy protection budget, A(y1) is a label obtained by performing perturbation processing on a label y1 by using the formula (5) or (6), and A(y2) is a label obtained by performing perturbation processing on a label y2 by using the formula (5) or (6). The inequation ensures that the attacker cannot determine with high confidence whether the two results A(y1) and A(y2) after perturbation are consistent with the real results y1 and y2, and therefore, cannot search for the decision boundary directly based on the label flipping method. In addition, the data processing apparatus may correspondingly set the first probability and the second probability based on the privacy protection budget ε, and flexibility is high. The data processing apparatus performs perturbation processing on the labels by using the random algorithm that satisfies the strict differential privacy definition, so that the attacker cannot search for the decision boundary directly based on the label flipping method to ensure high security and flexibility.

To prevent an attacker from determining a perturbation processing manner by querying a same piece of data for a plurality of times, the data processing apparatus may store data on which a recognition processing is performed by the data processing apparatus each time and an output result after the recognition processing is performed on the data, and before performing recognition processing on input data of the data processing apparatus, the data processing apparatus queries whether the input data exists in a historical record database to further directly output a stored output result or performs recognition processing on the input data based on the query result. An optional implementation is as follows: Before inputting the target data into the recognition model for recognition processing to obtain the first label, the data processing apparatus queries whether there is a historical processing record of the target data in the historical record database, where the historical processing record includes the label to which the target data belongs; and if there is no historical processing record of the target data in the historical record database, performs an operation of inputting the target data into the recognition model for recognition processing, to obtain the first label; and if there is the historical processing record of the target data in the historical record database, outputs the output result in the historical processing record in the target data (namely, the previously output result). When there is the historical processing record of the target data in the historical record database, a cached historical result is directly returned to the user, to prevent the attacker from determining a perturbation processing manner by querying a same piece of data for a plurality of times, and recognition processing does not need to be performed on the target data. When there is no historical processing record of the target data in the historical record database, recognition processing is performed on the target data by using the recognition model, and a corresponding label is output.

In some embodiments, there is a protection layer with a boundary differential privacy constraint (BDPL) in the recognition model. The boundary detection module 202 and the perturbation module 203 are the protection layer in the recognition model. After the data processing apparatus receives a new query (namely, the input data) from a user, if the query has appeared in a historical record (corresponding to the historical processing record) of the user, the protection layer directly returns a cached historical result to the user, to prevent the attacker from determining the perturbation processing manner by querying a same query for a plurality of times. If the query has not appeared in the historical record, the protection layer further detects whether label flipping occurs by using an endpoint feature vector, to determine whether the query is a sensitive query. If flipping occurs, the protection layer perturbs the original query result under the given privacy protection budget ε, and caches the perturbed query result into the historical record when returning the perturbed query result to the user. If flipping does not occur, the real query result is directly returned. For the first feature vector, to detect whether label flipping occurs by using an endpoint feature vector, to determine whether the query is a sensitive query is to determine whether the second feature vector exists. If the second feature vector exists, it is determined that the query is a sensitive query; and if the second feature vector does not exist, it is determined that the query is not a sensitive query. Refer to FIG. 5 for a piece of example code of the protection layer. In FIG. 5, $x_q$ represents a feature vector, Δ represents a boundary-sensitive zone parameter (namely, the first threshold), E is a privacy protection budget, $y_q$ is a query result (namely, a label obtained after recognition processing), f( ) represents the recognition processing performed by the recognition model, and an endpoint feature refers to an endpoint feature vector. In step 6 in which a boundary random response BRR is called to perturb the query result $y_q$ (namely, a label) into $y_q'$, perturbation processing may be performed on $y_q$ by using the formula (5) or the formula (6).

In this implementation, by querying whether there is the historical processing record of the target data in the historical record database, an attacker can be prevented from determining the perturbation processing manner by querying a same piece of data for a plurality of times, and recognition processing does not need to be performed on the target data.

Figure 6:
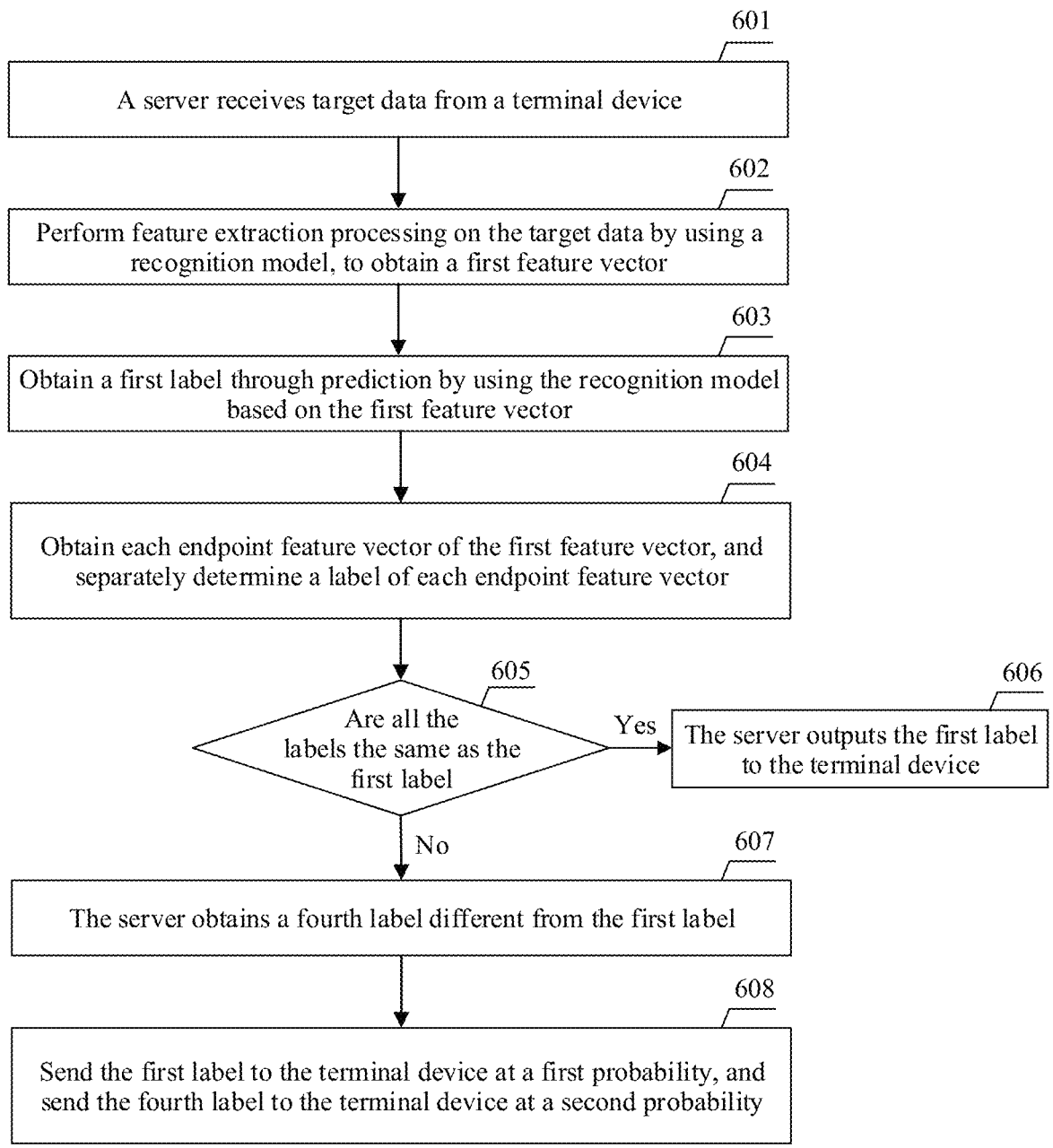
FIG. 6 is a flowchart of another data theft prevention method according to an embodiment of this application.

The following describes another data theft prevention method that is different than the data theft prevention method in FIG. 3. FIG. 6 is a flowchart of a data theft prevention method according to an embodiment of this application. As shown in FIG. 6, the method may include the following steps.

601. A server receives target data from a terminal device.

The server may be the foregoing data processing apparatus. The terminal device may be a mobile phone, a tablet computer, a notebook computer, or the like. The target data may be image data, speech data, text data, or the like. The terminal device may call a prediction interface provided by the server to obtain services such as image recognition, speech recognition, and text recognition. Optionally, before sending the target data to the server, the terminal device may receive the target data entered by a user. The server may receive the target data from the terminal device by using a transceiver, and call the prediction interface to provide services such as image recognition, speech recognition, and text recognition for the terminal device. The server may include the system architecture shown in FIG. 2. In other words, the server includes a recognition model 201, a boundary detection module 202, and a perturbation module 203.

602. The server performs feature extraction processing on the target data by using the recognition model, to obtain a first feature vector.

603. The server obtains a first label through prediction by using the recognition model based on the first feature vector.

The recognition model may be the recognition model 201 in FIG. 2. The recognition model 201 may first perform feature extraction on the input target data to obtain the first feature vector; and then obtain the first label through prediction based on the first feature vector.

604. The server obtains each endpoint feature vector of the first feature vector, and separately determines a label of each endpoint feature vector.

The first feature vector has d dimensions. That the server obtains each endpoint feature vector of the first feature vector may be that the boundary detection module 202 obtains 2d endpoint feature vectors of the first feature vector. The foregoing separately determining a label of each endpoint feature vector may be that the boundary detection module 202 sends the 2d endpoint feature vectors to the recognition model 201, and the recognition model 201 determines 2d labels based on the 2d endpoint feature vectors. The 2d labels are in one-to-one correspondence with the 2d endpoint feature vectors. That is, each label is determined by the recognition model 201 based on an endpoint feature vector corresponding to the label. The foregoing separately determining a label of each endpoint feature vector may alternatively be that the boundary detection module 202 sends the 2d endpoint feature vectors to the recognition model 201, and the recognition model 201 determines a label sequentially based on each of the 2d endpoint feature vectors, until a label different from the first label is obtained. For example, six endpoint feature vectors of the first feature vector are an endpoint feature vector 1 to an endpoint feature vector 6. The recognition model 201 may first predict a label 1 to which the target data belongs based on the endpoint feature vector 1; when the first label is the same as the label 1, the recognition model 201 predicts a label 2 to which the target data belongs based on the endpoint feature vector 2; and when the first label is different from the label 2, the recognition model 201 sends the label 2 to the boundary detection module 202. In this way, the recognition model 201 only needs to determine features of some endpoint feature vectors in most cases, and do not need to determine features of all the endpoint feature vectors, to reduce processing time.

605. The server determines whether labels of the endpoint feature vectors are all the same as the first label.

If the labels of the endpoint feature vectors are all the same as the first label, 606 is performed; and otherwise, 607 is performed.

606. The server outputs the first label to the terminal device.

607. The server obtains a fourth label different from the first label.

Optionally, the server obtains, from the labels of the endpoint feature vectors, any label different from the first label, to obtain the fourth label. Optionally, the fourth label is different from all the labels of the endpoint feature vectors.

608. The server sends the first label to the terminal device at a first probability, and sends the fourth label to the terminal device at a second probability.

That the server sends the first label to the terminal device at a first probability, and sends the fourth label to the terminal device at a second probability may be understood as that the server performs perturbation processing on the first label, to prevent the terminal device from searching for a boundary directly by using a label flipping method.

In some embodiments, the target data may be a to-be-recognized image, the first label may be a label obtained by performing image recognition on the to-be-recognized image by the server, and the fourth label is a label different from the first label. For example, the server receives an image from the terminal device, and a label obtained by performing recognition on the image by using the recognition model by the server is "cat" (corresponding to the first label). When a feature vector obtained based on the image is located in a boundary-sensitive zone, the server sends an incorrect label (corresponding to the fourth label) to the terminal device. When the feature vector obtained based on the image is not located in the boundary-sensitive zone, the server sends the label "cat" to the terminal device. The incorrect label may be any label other than "cat". The feature vector obtained based on the image may be a feature vector obtained by performing feature extraction processing on the image by using the recognition model by the server. It should be understood that, assuming that the feature vector obtained based on the image is the foregoing first feature vector, if the second feature vector exists, an incorrect label is sent to the terminal device, and otherwise, the label "cat" is sent to the terminal device.

In some embodiments, the target data may be some of all the data sent by the terminal device to the server, and the server needs to determine a label of the target data. For example, the terminal device sends an image to the server. The image includes a plurality of characters. The target data may be a character in the image. A method process in FIG. 6 may be a process of recognizing a character in the image, and outputting the character. In practical application, the user may send the image including the plurality of characters to the server by using the terminal device, and the server may perform text recognition on the image by using the recognition model, and sends a text recognition result to the terminal device. The text recognition result includes a plurality of recognized characters, and each character is a label. In other words, the text recognition result may be understood as a series of labels. Therefore, a process in which the server recognizes a piece of text and sends the text to the terminal device may be an application of the method in FIG. 6. In another example, the terminal device sends a piece of speech data to the server. The server may perform speech recognition on the speech data by using the recognition model, and send a speech recognition result to the terminal device. The speech recognition result includes a plurality of pieces of text, and each piece of text may be a label. In other words, the text recognition result may be understood as a series of labels. The method process in FIG. 6 may be a process in which the server performs speech recognition on some of the speech data, to obtain a piece of text, and then outputs the text. It may be understood that, the method in FIG. 6 may be a subtask in a large task, and the subtask may be a classification task. For example, in a text recognition task, the server needs to recognize a plurality of characters included in an image. The method process in FIG. 6 is used for determining each character, and each character is a label. In another example, in a speech recognition task, the speech data is divided into a plurality of parts. The method in FIG. 6 may be used for determining a label of each part.

In this embodiment of this application, the server outputs the target label when determining that the second feature vector exists, so that a parameter of the recognition model can be effectively prevented from being obtained.

Figure 7:
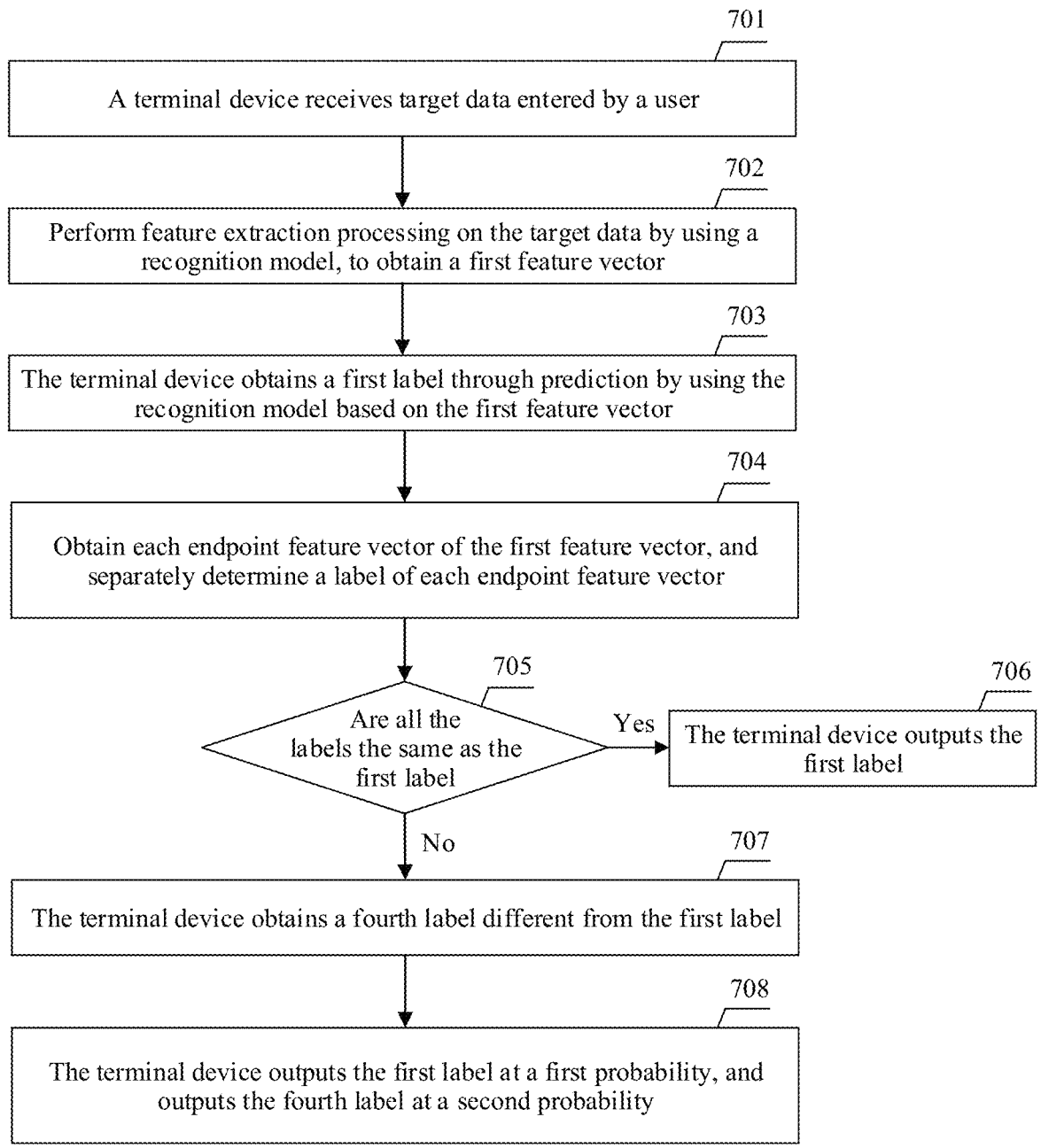
FIG. 7 is a flowchart of still another data-theft prevention method according to an embodiment of this application.

The following describes still another data theft prevention method that is different than the data theft prevention method in FIG. 3. FIG. 7 is a flowchart of a data theft prevention method according to an embodiment of this application. As shown in FIG. 7, the method may include the following steps.

701. A terminal device receives target data entered by a user.

The terminal device may be the foregoing data processing apparatus. The terminal device may be a mobile phone, a tablet computer, a notebook computer, or the like. The target data may be image data, speech data, text data, or the like. For example, the terminal device receives speech data entered by the user. The terminal device may include the system architecture shown in FIG. 2, and may provide prediction services such as image recognition, speech recognition, and text recognition. In other words, the terminal device includes a recognition model 201, a boundary detection module 202, and a perturbation module 203.

702. The terminal device performs feature extraction processing on the target data by using the recognition model, to obtain a first feature vector.

703. The terminal device obtains a first label through prediction by using the recognition model based on the first feature vector.

The recognition model may be the recognition model 201 in FIG. 2. The recognition model 201 may first perform feature extraction on the input target data to obtain the first feature vector; and then obtain the first label through prediction based on the first feature vector.

704. The terminal device obtains each endpoint feature vector of the first feature vector, and separately determines a label of each endpoint feature vector.

An implementation of step 704 is similar to an implementation of step 604. Details are not described herein again.

705. The terminal device determines whether the labels of the endpoint feature vectors are the same as the first label.

If the labels of the endpoint feature vectors are the same as the first label, step 706 is performed; and otherwise, step 707 is performed. An implementation of step 705 is similar to an implementation of step 605.

706. The terminal device outputs the first label.

707. The terminal device obtains a fourth label different from the first label.

Optionally, the terminal device obtains, from the labels of the endpoint feature vectors, any label different from the first label, to obtain the fourth label. Optionally, the fourth label is different from all the labels of the endpoint feature vectors.

708. The terminal device outputs the first label at a first probability, and outputs the fourth label at a second probability.

In some embodiments, the target data may be a to-be-recognized image, the first label may be a label obtained by performing image recognition on the to-be-recognized image by the terminal device, and the fourth label is a label different from the first label. For example, the terminal device receives an image entered by the user, and a label obtained by performing recognition on the image by using the recognition model is "cat" (corresponding to the first label). When a feature vector obtained based on the image is located in a boundary-sensitive zone, the terminal device outputs an incorrect label (corresponding to the fourth label). When the feature vector obtained based on the image is not located in the boundary-sensitive zone, the terminal device outputs the label "cat". The incorrect label may be any label other than "cat". The feature vector obtained based on the image may be a feature vector obtained by performing feature extraction processing on the image by the terminal device.

In some embodiments, the target data may be some of the data that is entered by the user and that is received by the terminal device, and the terminal device needs to determine a label of the target data. For example, the terminal device receives an image entered by the user. The image includes a plurality of characters. The target data may be a character in the image. A method process in FIG. 7 may be a process of recognizing a character in the image, and outputting the character. In practical application, the user may input an image including a plurality of characters to the terminal device, and the terminal device may perform text recognition on the image by using the recognition model, and output a text recognition result. The text recognition result includes a plurality of recognized characters, and each character is a label. In other words, the text recognition result may be understood as a series of labels. Therefore, a process in which the terminal device recognizes a piece of text and outputs the text may be an application of the method in FIG. 7. In another example, the terminal device receives a piece of speech data entered by the user. The terminal device may perform speech recognition on the speech data by using the recognition model, and output a speech recognition result. The speech recognition result includes a plurality of pieces of text, and each piece of text may be a label. In other words, the text recognition result may be understood as a series of labels. The method process in FIG. 7 may be a process in which the terminal device performs speech recognition on some of the speech data, obtain a piece of text, and then outputs the text. It may be understood that, the method in FIG. 7 may be a subtask in a large task, and the subtask may be a classification task. For example, in a text recognition task, the terminal device needs to recognize a plurality of characters included in an image. The method process in FIG. 7 may be used for determining each character, and each character is a label. In another example, in a speech recognition task, the speech data is divided into a plurality of parts. The method in FIG. 7 may be used for determining a label of each part.

In this embodiment of this application, the terminal device performs perturbation processing on the label obtained based on the feature vector located in the boundary-sensitive zone, to effectively prevent a parameter of the recognition model from being obtained by unauthorized users.

Figure 8:
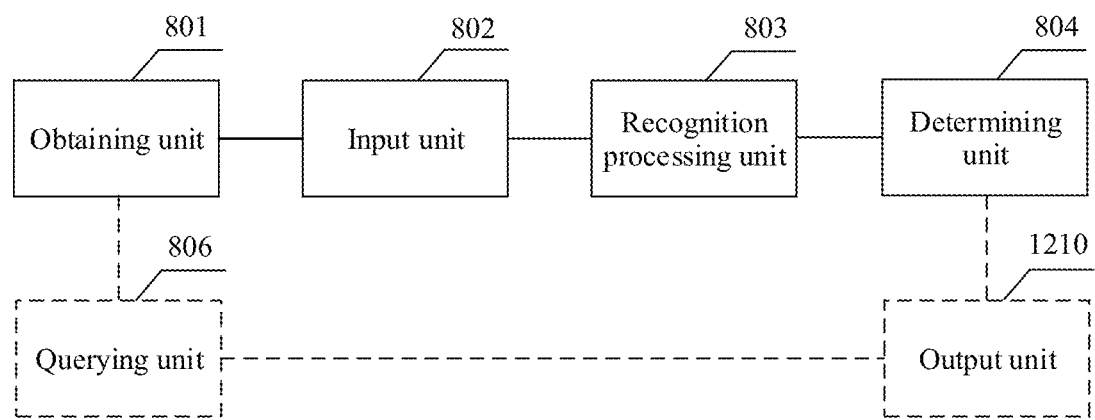
FIG. 8 is a schematic structural diagram of a data processing apparatus according to an embodiment of this application.

FIG. 8 is a schematic structural diagram of a data processing apparatus according to an embodiment of this application. As shown in FIG. 8, the apparatus includes:
an obtaining unit 801, configured to obtain target data, where the target data includes one or more computer-processable signals;
an input unit 802, configured to input a target image into a recognition processing unit 803;
the recognition processing unit 803, configured to perform recognition processing on the target data by using a recognition model, to obtain a first label, where the first label is a label to which the target data belongs, and the recognition processing includes: performing, by the recognition model, feature extraction processing on the target data to obtain a first feature vector; and obtaining, by the recognition model, the first label through prediction based on the first feature vector; and
an output unit 805, configured to output a target label when a determining unit 804 determines that a second feature vector exists, where the second feature vector is a feature vector whose distance from the first feature vector is less than a first threshold, a second label obtained by the recognition model through prediction based on the second feature vector is different from the first label, and the target label is a label obtained by performing perturbation processing on the first label.

In an optional implementation, the determining unit 804 is configured to obtain a feature vector whose distance from the first feature vector is less than the first threshold to obtain a third feature vector;
the recognition processing unit 803 is further configured to obtain a third label through prediction based on the third feature vector; and
the determining unit 804 is configured to determine that the third feature vector is the second feature vector when the first label is different from the third label.

In an optional implementation, the first feature vector includes N feature values, each feature value corresponds to a dimension, and N is an integer greater than 1; and
the determining unit 804 is configured to add or subtract a second threshold to or from a feature value of any dimension included in the first feature vector to obtain the third feature vector, where the second threshold is less than the first threshold.

In an optional implementation, the output unit 805 is configured to: output the first label at a first probability by using a random algorithm, and output a fourth label at a second probability, where the fourth label is different from the first label, and a sum of the first probability and the second probability is 1.

In an optional implementation, the random algorithm provides ε-differential privacy protection, where the parameter ε is referred to as a privacy protection budget.

In an optional implementation, the output unit 805 is further configured to output the first label when the determining unit determines that the second feature vector does not exist.

In an optional implementation, the apparatus further includes: a querying unit 806, configured to query whether there is a historical processing record of the target data in a historical record database, where the historical processing record includes the label to which the target data belongs. The recognition processing unit is configured to perform recognition processing on the target data to obtain the first label, when the querying unit fails to find the historical processing record of the target data.

In an optional implementation, the one or more computer-processable signals include: at least one of a speech signal, a text signal, or an image signal.

Figure 9:
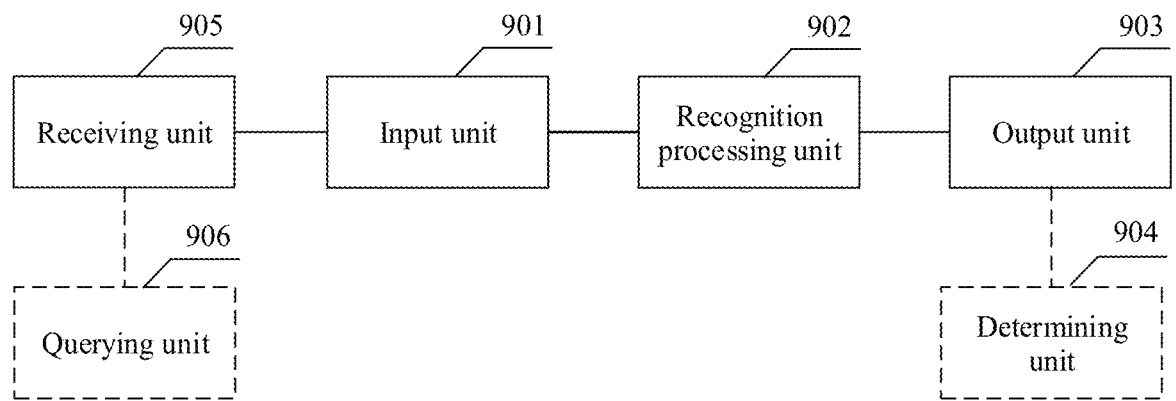
FIG. 9 is a schematic structural diagram of another data processing apparatus according to an embodiment of this application.

FIG. 9 is a schematic structural diagram of a data processing apparatus according to an embodiment of this application. As shown in FIG. 9, the apparatus includes:

an input unit 901, configured to input a target image into a recognition processing unit 902;

the recognition processing unit 902, configured to perform recognition processing on the target image by using a recognition model, to obtain a first label, where the first label is a label to which the target image belongs, and the recognition processing includes: performing, by the recognition model, feature extraction processing on the target image to obtain a first feature vector; and obtaining, by the recognition model, the first label through prediction based on the first feature vector; and an output unit 903, configured to output a target label when a determining unit 904 determines that a second feature vector exists, where the second feature vector is a feature vector whose distance from the first feature vector is less than a first threshold, a second label obtained by the recognition model through prediction based on the second feature vector is different from the first label, and the target label is a label obtained by performing perturbation processing on the first label.

In an optional implementation, the apparatus further includes: a receiving unit 905, configured to receive the target image from a terminal device, and the output unit 903 is configured to send the target label to the terminal device.

In an optional implementation, the determining unit 904 is configured to obtain a feature vector whose distance from the first feature vector is less than the first threshold to obtain a third feature vector;

the recognition processing unit 902 is further configured to obtain a third label through prediction by using the recognition model based on the third feature vector; and the determining unit 904 is configured to determine that the third feature vector is the second feature vector when the first label is different from the third label.

In an optional implementation, the output unit 903 is configured to send the first label to the terminal device at a first probability by using a random algorithm, and send a fourth label to the terminal device at a second probability, where the fourth label is different from the first label, and a sum of the first probability and the second probability is 1.

In an optional implementation, the random algorithm provides ε-differential privacy protection, where the parameter ε is referred to as a privacy protection budget.

In an optional implementation, the output unit 903 is further configured to output the first label when the determining unit determines that the second feature vector does not exist.

In an optional implementation, the apparatus further includes: a querying unit 906, configured to query whether there is a historical processing record of the target image in a historical record database, where the historical processing record includes the label to which the target image belongs. The recognition processing unit is specifically configured to perform recognition processing on the target image to obtain the first label, when the querying unit fails to find the historical processing record of the target image.

Figure 10:
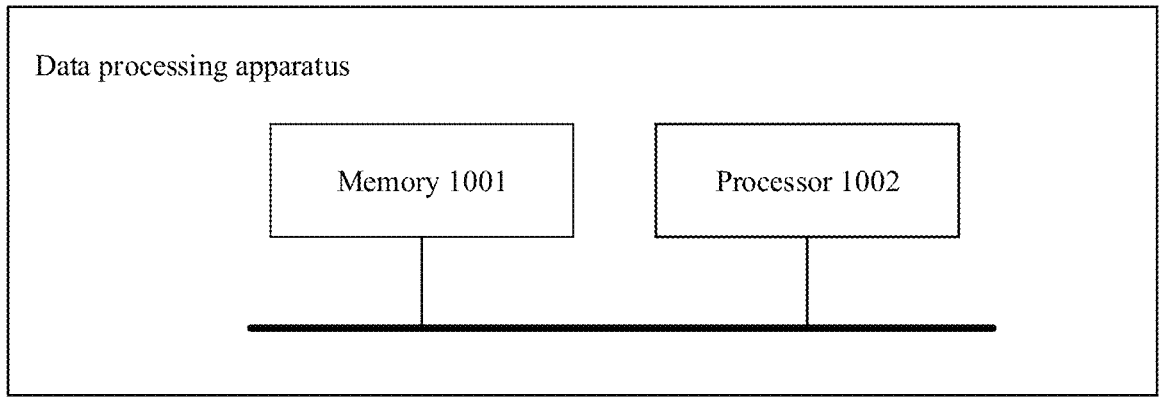
FIG. 10 is a schematic structural diagram of still another data processing apparatus according to an embodiment of this application.

FIG. 10 is a schematic structural diagram of a data processing apparatus according to an embodiment of this application. As shown in FIG. 10, the apparatus includes a memory 1001 and a processor 1002. The memory 1001 is configured to store code. The processor 1002 executes the code stored in the memory to perform the following operations: obtaining target data, where the target data includes one or more computer-processable signals; inputting the target data into a recognition model for recognition processing, to obtain a first label, where the first label is a label to which the target data belongs, and the recognition processing includes: performing, by the recognition model, feature extraction processing on the target data to obtain a first feature vector; and obtaining, by the recognition model, the first label through prediction based on the first feature vector; and outputting a target label when determining that a second feature vector exists, where the second feature vector is a feature vector whose distance from the first feature vector is less than a first threshold, a second label obtained by the recognition model through prediction based on the second feature vector is different from the first label, and the target label is a label obtained by performing perturbation processing on the first label.

The processor 1002 is configured to implement functions of the recognition model 201, the boundary detection module 202, and the perturbation module 203 in FIG. 2. The processor 1002 may implement functions of the units in FIG. 8.

In an optional implementation, the processor 1002 is configured to: obtain a feature vector whose distance from the first feature vector is less than the first threshold to obtain a third feature vector; obtain a third label through prediction by using the recognition model based on the third feature vector; and determine that the third feature vector is the second feature vector when the first label is different from the third label.

In an optional implementation, the first feature vector includes N feature values, each feature value corresponds to a dimension, and N is an integer greater than 1; and the processor 1002 is configured to add or subtract a second threshold to or from a feature value of any dimension included in the first feature vector to obtain the third feature vector, where the second threshold is less than the first threshold.

In an optional implementation, the processor 1002 is configured to: output the first label at a first probability by using a random algorithm, and output a fourth label at a second probability, where the fourth label is different from the first label, and a sum of the first probability and the second probability is 1.

In an optional implementation, the random algorithm provides ε-differential privacy protection, where the parameter ε is referred to as a privacy protection budget.

In an optional implementation, the processor 1002 is further configured to output the first label when determining that the second feature vector does not exist.

In an optional implementation, the processor 1002 is further configured to: query whether there is a historical processing record of the target data in a historical record database, where the historical processing record includes the label to which the target data belongs; and if there is no historical processing record of the target data in the historical record database, perform an operation of inputting the target data into the recognition model for recognition processing, to obtain the first label.

In an optional implementation, the one or more computer-processable signals include: at least one of a speech signal, a text signal, or an image signal.

Figure 11:
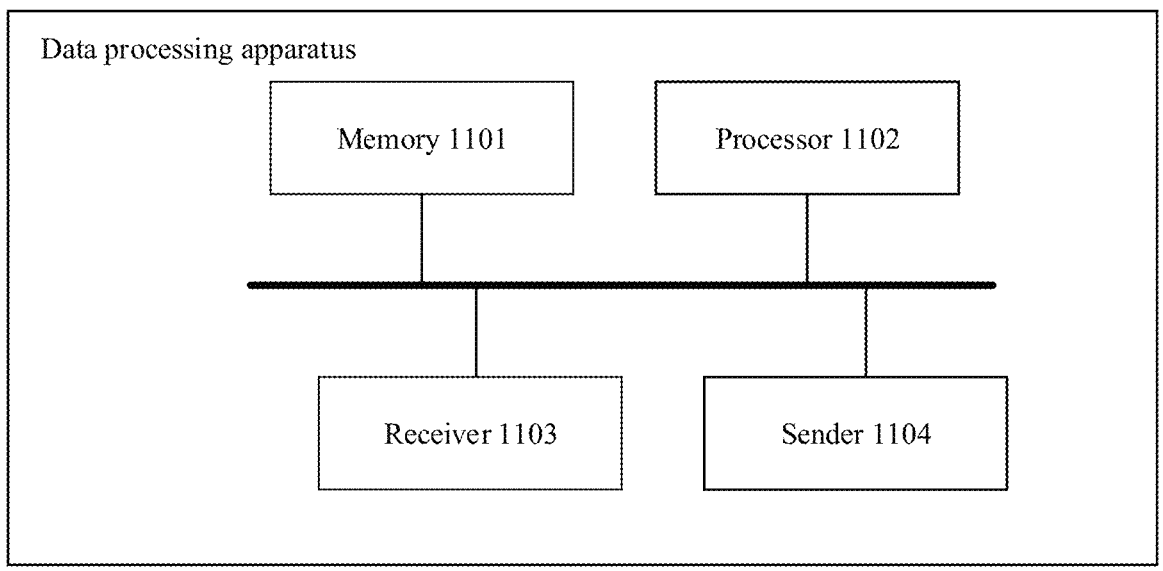
FIG. 11 is a schematic structural diagram of still another data processing apparatus according to an embodiment of this application.

FIG. 11 is a schematic structural diagram of a data processing apparatus according to an embodiment of this application. As shown in FIG. 11, the apparatus includes a memory 1101 and a processor 1102. The memory 1101 is configured to store code. The processor 1102 reads the code stored in the memory and executes the code to perform the following operations: inputting a target image into a recognition model for recognition processing, to obtain a first label, where the first label is a label to which the target image belongs, and the recognition processing includes: performing, by the recognition model, feature extraction processing on the target image to obtain a first feature vector; and obtaining, by the recognition model, the first label through prediction based on the first feature vector; and outputting a target label when determining that a second feature vector exists, where the second feature vector is a feature vector whose distance from the first feature vector is less than a first threshold, a second label obtained by the recognition model through prediction based on the second feature vector is different from the first label, and the target label is a label obtained by performing perturbation processing on the first label.

The processor 1102 is configured to implement functions of the recognition model 201, the boundary detection module 202, and the perturbation module 203 in FIG. 2. The processor 1102 may implement functions of the input unit 901, the recognition processing unit 902, the determining unit 904, and the querying unit 906 in FIG. 9.

In an optional implementation, the apparatus further includes: a receiver 1103, configured to receive the target image from a terminal device; and a transmitter 1104, configured to send the target label to the terminal device under control of the processor. The receiver 1103 may implement a function of the receiving unit 905 in FIG. 9.

In an optional implementation, the processor 1102 is configured to: obtain a feature vector whose distance from the first feature vector is less than the first threshold to obtain a third feature vector; obtain a third label through prediction by using the recognition model based on the third feature vector; and determine that the third feature vector is the second feature vector when the first label is different from the third label.

In an optional implementation, the first feature vector includes N feature values, each feature value corresponds to a dimension, and N is an integer greater than 1; and the processor 1102 is configured to add or subtract a second threshold to or from a feature value of any dimension included in the first feature vector to obtain the third feature vector, where the second threshold is less than the first threshold.

In an optional implementation, the transmitter 1104 is configured to: send the first label to the terminal device at a first probability by using a random algorithm under the control of the processor, and send a fourth label to the terminal device at a second probability, where the fourth label is different from the first label, and a sum of the first probability and the second probability is 1. The transmitter 1104 may implement a function of the output unit 903 in FIG. 9.

In an optional implementation, the random algorithm provides ε-differential privacy protection, where the parameter ε is referred to as a privacy protection budget.

In an optional implementation, the processor 1102 is further configured to output the first label when determining that the second feature vector does not exist.

In an optional implementation, the processor 1102 is further configured to: query whether there is a historical processing record of the target image in a historical record database, where the historical processing record includes the label to which the target image belongs; and if there is no historical processing record of the target image in the historical record database, perform an operation of inputting the target data into the recognition model for recognition processing, to obtain the first label.

In this embodiment of this application, the memory 1001 and the memory 1101 may be a read-only memory (ROM), a static storage device, a dynamic storage device, or a random access memory (RAM). The memory may store an operating system and other applications. The processor 1002 and the processor 1102 may be a general-purpose central processing unit (CPU), a microprocessor, an application-specific integrated circuit (ASIC), a GPU, or one or more integrated circuits, configured to execute related programs, to implement functions to be executed by the units in the data processing apparatus in the embodiments of this application, or perform the data theft prevention method according to the method embodiments of this application. The processor may be an integrated circuit chip and has a signal processing capability. In an implementation process, each step of the method provided in this application may be completed by using an integrated logic circuit of hardware in the processor or an instruction in a form of software. The foregoing processor may alternatively be a general purpose processor, a neural network processor, a digital signal processor (DSP), an application-specific integrated circuit (ASIC), or a field programmable gate array (FPGA) or other programmable logic devices, discrete gate or transistor logic devices, discrete hardware components. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished using a hardware decoding processor, or may be executed and accomplished by using a combination of hardware and software modules in the decoding processor. A software module may be located in a storage medium of mature technology in the art, such as a random access memory, a flash memory, a read-only memory, a programmable read-only memory, an electrically erasable programmable memory, or a register.

An embodiment of this application provides a computer-readable storage medium. The computer-readable storage medium stores a computer program. The computer program includes software program instructions. When the program instructions are executed by a processor in a data processing device, the data theft prevention method in the foregoing embodiments is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instruction may be stored in a computer readable storage medium, or transmitted by using the computer readable storage medium. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A data theft prevention method, wherein the method comprises:
    obtaining target data, wherein the target data comprises one or more computer-processable signals;
    inputting the target data into a recognition model for recognition processing, to obtain a first label, wherein the first label is a label to which the target data belongs, and the recognition processing comprises: performing, by the recognition model, feature extraction processing on the target data to obtain a first feature vector; and obtaining, by the recognition model, the first label through prediction based on the first feature vector; and
    outputting a target label when determining that a second feature vector exists, wherein the second feature vector is a feature vector whose distance from the first feature vector is less than a first threshold, a second label obtained by the recognition model through prediction based on the second feature vector is different from the first label, and the target label is a label obtained by performing perturbation processing on the first label.

2. The method according to claim 1, wherein the determining that a second feature vector exists comprises:
    obtaining a feature vector whose distance from the first feature vector is less than the first threshold to obtain a third feature vector;
    obtaining a third label through prediction by using the recognition model based on the third feature vector; and
    determining that the third feature vector is the second feature vector when the first label is different from the third label.

3. The method according to claim 2, wherein the first feature vector comprises N feature values, each feature value corresponds to a dimension, and N is an integer greater than 1; and the obtaining a feature vector whose distance from the first feature vector is less than the first threshold to obtain a third feature vector comprises:
    adding or subtracting a second threshold to or from a feature value of any dimension comprised in the first feature vector to obtain the third feature vector, wherein the second threshold is less than the first threshold.

4. The method according to claim 1, wherein the outputting a target label comprises:
    outputting the first label at a first probability by using a random algorithm, and outputting a fourth label at a second probability, wherein the fourth label is different from the first label, and a sum of the first probability and the second probability is 1.

5. The method according to claim 4, wherein the random algorithm provides ε-differential privacy protection, wherein a parameter ε refers to a privacy protection budget.

6. The method according to claim 1, wherein after the inputting target data into a recognition model for recognition processing, to obtain a first label, the method further comprises:
    outputting the first label when determining that the second feature vector does not exist.

7. The method according to claim 1, wherein before the inputting target data into a recognition model for recognition processing, to obtain a first label, the method further comprises:
    querying whether there is a historical processing record of the target data in a historical record database, wherein the historical processing record comprises the label to which the target data belongs; and
    when there is no historical processing record of the target data in the historical record database, performing the inputting the target data into the recognition model for recognition processing, to obtain the first label.

8. A data theft prevention method, comprising:
    receiving a target image from a terminal device;
    inputting the target image into a recognition model for recognition processing, to obtain a first label, wherein the first label is a label to which the target image belongs, and the recognition processing comprises: performing, by the recognition model, feature extraction processing on the target image to obtain a first feature vector; and obtaining, by the recognition model, the first label through prediction based on the first feature vector; and
    outputting a target label when determining that a second feature vector exists, wherein the outputting of the target label comprises sending the target label to the terminal device, wherein the second feature vector is a feature vector whose distance from the first feature vector is less than a first threshold, a second label obtained by the recognition model through prediction based on the second feature vector is different from the first label, and the target label is a label obtained by performing perturbation processing on the first label.

9. The method according to claim 8, wherein the determining that a second feature vector exists comprises:
    obtaining a feature vector whose distance from the first feature vector is less than the first threshold to obtain a third feature vector;
    obtaining a third label through prediction by using the recognition model based on the third feature vector; and
    determining that the third feature vector is the second feature vector when the first label is different from the third label.

10. The method according to claim 8, wherein the outputting of a target label further comprises:
    sending the first label to the terminal device at a first probability by using a random algorithm, and sending a fourth label to the terminal device at a second probability, wherein the fourth label is different from the first label, and a sum of the first probability and the second probability is 1.

11. The method according to claim 10, wherein the random algorithm provides ε-differential privacy protection, wherein a parameter ε refers to a privacy protection budget.

12. A data processing apparatus, wherein the apparatus comprises a memory and a processor, the memory is configured to store code, and the processor is configured to perform the following operations by executing the code stored in the memory:

obtaining target data, wherein the target data comprises one or more computer-processable signals;

inputting the target data into a recognition model for recognition processing to, obtain a first label, wherein the first label is a label to which the target data belongs, and the recognition processing comprises: performing, by the recognition model, feature extraction processing on the target data to obtain a first feature vector; and obtaining, by the recognition model, the first label through prediction based on the first feature vector; and outputting a target label when determining that a second feature vector exists, wherein the second feature vector is a feature vector whose distance from the first feature vector is less than a first threshold, a second label obtained by the recognition model through prediction based on the second feature vector is different from the first label, and the target label is a label obtained by performing perturbation processing on the first label.

13. The apparatus according to claim 12, wherein the processor is configured to obtain a feature vector whose distance from the first feature vector is less than the first threshold to obtain a third feature vector;

obtaining a third label through prediction by using the recognition model based on the third feature vector; and determining that the third feature vector is the second feature vector when the first label is different from the third label.

14. The apparatus according to claim 13, wherein the first feature vector comprises N feature values, each feature value corresponds to a dimension, and N is an integer greater than 1; and the processor is configured to add or subtract a second threshold to or from a feature value of any dimension comprised in the first feature vector to obtain the third feature vector, wherein the second threshold is less than the first threshold.

15. The apparatus according to claim 12, wherein the processor is configured to output the first label at a first probability by using a random algorithm, and output a fourth label at a second probability, wherein the fourth label is different from the first label, and a sum of the first probability and the second probability is 1.

16. The apparatus according to claim 15, wherein the random algorithm provides ε-differential privacy protection, wherein a parameter ε refers to a privacy protection budget.

17. The apparatus according to claim 12, wherein the processor is further configured to output the first label when determining that the second feature vector does not exist.

18. The apparatus according to claim 12, wherein the processor is further configured to:

query whether there is a historical processing record of the target data in a historical record database, wherein the historical processing record comprises the label to which the target data belongs; and when there is no historical processing record of the target data in the historical record database, perform the inputting the target data into the recognition model for recognition processing to obtain the first label.

19. A data processing apparatus, wherein the apparatus comprises a memory and a processor, wherein the memory is configured to store code, and the processor is configured to perform the following operations by executing the code stored in the memory:

inputting a target image into a recognition model for recognition processing, to obtain a first label, wherein the first label is a label to which the target image belongs, and the recognition processing comprises: performing, by the recognition model, feature extraction processing on the target image to obtain a first feature vector; and obtaining, by the recognition model, the first label through prediction based on the first feature vector; and outputting a target label when determining that a second feature vector exists, wherein the second feature vector is a feature vector whose distance from the first feature vector is less than a first threshold, a second label obtained by the recognition model through prediction based on the second feature vector is different from the first label, and the target label is a label obtained by performing perturbation processing on the first label.

20. A non-transitory computer-readable storage medium, wherein the computer-readable storage medium stores a computer program, the computer program comprises program instructions, and when the program instructions are executed by a processor of a mobile device, the processor is enabled to perform operations of:

obtaining target data, wherein the target data comprises one or more computer-processable signals;

inputting the target data into a recognition model for recognition processing, to obtain a first label, wherein the first label is a label to which the target data belongs, and the recognition processing comprises: performing, by the recognition model, feature extraction processing on the target data to obtain a first feature vector; and obtaining, by the recognition model, the first label through prediction based on the first feature vector; and outputting a target label when determining that a second feature vector exists, wherein the second feature vector is a feature vector whose distance from the first feature vector is less than a first threshold, a second label obtained by the recognition model through prediction based on the second feature vector is different from the first label, and the target label is a label obtained by performing perturbation processing on the first label.

* * * * *

UNITED STATES PATENT AND TRADEMARK OFFICE
CERTIFICATE OF CORRECTION

PATENT NO. : 12,164,605 B2
APPLICATION NO. : 17/698619
DATED : December 10, 2024
INVENTOR(S) : Haibo Hu et al.

Page 1 of 1

It is certified that error appears in the above-identified patent and that said Letters Patent is hereby corrected as shown below:

In the Claims

In Column 35, Claim 14, Line 31, delete "Nis" and insert -- N is --, therefor.

Signed and Sealed this
Fourth Day of February, 2025

Coke Morgan Stewart
*Acting Director of the United States Patent and Trademark Office*